US009009473B2

(12) United States Patent
Reyna Almandos et al.

(10) Patent No.: US 9,009,473 B2
(45) Date of Patent: Apr. 14, 2015

(54) PROVIDING CONSISTENT CRYPTOGRAPHIC OPERATIONS ACROSS SEVERAL APPLICATIONS

(75) Inventors: Patricio Marcelo Reyna Almandos, La Plata (AR); Eduardo Martin Coria, Capital Federal (AR); Mariela Claudia Lanza, Capital Federal (AR); Guillermo Manzato, Capitol Federal (AR); Mariano Alejandro Prediletto, Capitol Federal (AR); James J Whitmore, Carlisle, PA (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 13/272,967

(22) Filed: Oct. 13, 2011

(65) Prior Publication Data
US 2013/0097425 A1 Apr. 18, 2013

(51) Int. Cl.
*H04L 29/06* (2006.01)
*H04L 9/32* (2006.01)
*G06F 21/60* (2013.01)

(52) U.S. Cl.
CPC ............ *H04L 9/3247* (2013.01); *G06F 21/602* (2013.01); *H04L 2209/68* (2013.01); *H04L 63/20* (2013.01)

(58) Field of Classification Search
CPC ....... G06F 21/00; G06F 21/60; G06F 21/602; G06F 21/606; G06F 21/6209; G06F 21/64; G06F 21/645; G06F 2221/2125; H04L 9/14; H04L 2209/38; H04L 63/0428–63/0478; H04L 63/10–63/108; H04L 63/12–63/126; H04L 2463/041

USPC ......... 713/150–152, 160–161, 164, 167, 176; 726/1; 709/228, 236, 246
See application file for complete search history.

(56) References Cited

U.S. PATENT DOCUMENTS

| 5,991,877 | A   |   | 11/1999 | Luckenbaugh |
| 6,321,201 | B1  |   | 11/2001 | Dahl |
| 6,516,316 | B1  | * | 2/2003  | Ramasubramani et al. .......... 1/1 |
| 7,103,773 | B2  |   | 9/2006  | Erickson et al. |
| 7,260,555 | B2  |   | 8/2007  | Rossmann et al. |
| 7,516,333 | B2  |   | 4/2009  | Yunis et al. |
| 7,661,103 | B2  | * | 2/2010  | Hayward ....................... 717/178 |
| 8,346,929 | B1  | * | 1/2013  | Lai ................................ 709/226 |
| 2002/0112152 | A1 | * | 8/2002 | VanHeyningen et al. ..... 713/151 |

(Continued)

*Primary Examiner* — Saleh Najjar
*Assistant Examiner* — Eric W Shepperd
(74) *Attorney, Agent, or Firm* — Garg Law Firm, PLLC; Rakesh Garg; Parashos T. Kalaitzis

(57) ABSTRACT

Providing consistent cryptographic operations across several applications using secure structured data objects includes a security middleware component, using an application programming interface, receiving a data input from an originating application operating in application space. Both the application and the middleware component execute in the data processing system. A security schema object is retrieved by the security middleware component from an object store, the security schema object describing a sequence of cryptographic operations and includes several components describing aspects of the cryptographic operations. The data input is transformed from a first format to a second format where one of the formats is a secure structured data object formed using the sequence of cryptographic operations. A property of the secure structured data object contains data about the security schema object. The data input is transmitted in the second format to a consumer application operating in application space.

20 Claims, 18 Drawing Sheets

(56) References Cited

U.S. PATENT DOCUMENTS

| | | |
|---|---|---|
| 2004/0168064 A1 | 8/2004 | Shimizu et al. |
| 2004/0186998 A1 | 9/2004 | Kim et al. |
| 2005/0081063 A1* | 4/2005 | Patrick et al. ............... 713/201 |
| 2005/0144457 A1 | 6/2005 | Lee et al. |
| 2005/0273772 A1* | 12/2005 | Matsakis et al. ............ 717/136 |
| 2006/0004771 A1* | 1/2006 | Enenkiel ...................... 707/10 |
| 2006/0026667 A1 | 2/2006 | Bhinde et al. |
| 2006/0265689 A1* | 11/2006 | Kuznetsov et al. .......... 717/117 |
| 2007/0283150 A1 | 12/2007 | Cozianu |
| 2008/0077167 A1* | 3/2008 | Flynn et al. .................. 606/172 |
| 2008/0098212 A1* | 4/2008 | Helms et al. ................. 713/155 |
| 2008/0141341 A1* | 6/2008 | Vinogradov et al. ............ 726/2 |
| 2008/0270802 A1 | 10/2008 | Ashley et al. |
| 2009/0099882 A1* | 4/2009 | Karabulut ........................ 705/7 |
| 2010/0071066 A1* | 3/2010 | Kline et al. .................... 726/25 |
| 2011/0110364 A1* | 5/2011 | Fried et al. .................... 370/352 |
| 2012/0290837 A1* | 11/2012 | Vion-Dury .................... 713/167 |
| 2013/0031356 A1* | 1/2013 | Prince et al. .................. 713/151 |

\* cited by examiner

PROVIDING CONSISTENT CRYPTOGRAPHIC OPERATIONS ACROSS SEVERAL APPLICATIONS

RELATED APPLICATION

The present invention is related to similar subject matter of co-pending and commonly assigned U.S. patent application Ser. No. 13/272,797 entitled "PROVIDING CONSISTENT CRYPTOGRAPHIC OPERATIONS," filed on Oct. 13, 2011, which is hereby incorporated by reference.

BACKGROUND OF THE INVENTION

1. Field of the Invention

The present invention relates generally to an improved data processing system, and in particular, to a computer implemented method for improving data security. Still more particularly, the present invention relates to a computer implemented method, system, and computer usable program code for providing consistent cryptographic operations across several applications using secure structured data objects.

2. Description of the Related Art

Modern data processing systems and software have standards and techniques to facilitate interoperability. One technique that promotes interoperability of information is organizing information in a well-defined organization or structure, using a commonly known computer readable language.

One example of such a technique is a "markup language". Extensible Markup Language (XML) is one example of a markup language. XML provides a standard framework for creating data objects. A data object is an organization of data according to a defined structure. An XML data object can be self-defining. In other words, XML provides a definition of a structure that included data follows, followed by the data according to that defined structure. XML provides a way to convey data in a human readable form as well as in a computer usable form.

Information about data is commonly referred to as meta-data. Some examples of meta-data are the structure and characteristics of data as described in XML. A data object that includes both data and meta-data is commonly referred to as a structured data object.

Modern computing systems that process structured data do so via software components. The software components for creating and conveying structured data objects are often paired with software components that receive and consume those structured data objects. These software components must have a common understanding of how to handle the given structured data object in order to inter-operate.

As the contents of structured data objects and meta-data have increased in complexity, the software components to create, convey, and consume the structured data objects have also become increasingly complex. One example necessity that has contributed to the increasing complexity is the concern with data security. Presently, standards exist to support cryptographic protections of data. For example, key-pair encryption and digital certificates can presently be used to encrypt data.

SUMMARY OF THE INVENTION

The invention provides a method, system, and computer usable program product for providing consistent cryptographic operations across several applications executing in a data processing system using secure structured data objects. A security middleware component, through the use of an application programming interface, receives a data input from an originating application operating in application space. Both the application and the middleware component execute in the data processing system. A security schema object is retrieved by the security middleware component from an object store. The security schema object describes a sequence of cryptographic operations. The security schema object includes a plurality of components, each component describing an aspect of the cryptographic operations. The data input is transformed from a first format to a second format, where one of the first and second formats is a secure structured data object formed using the sequence of cryptographic operations, and a property of the secure structured data object contains data about the security schema object. The data input is transmitted in the second format to a consumer application operating in application space.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
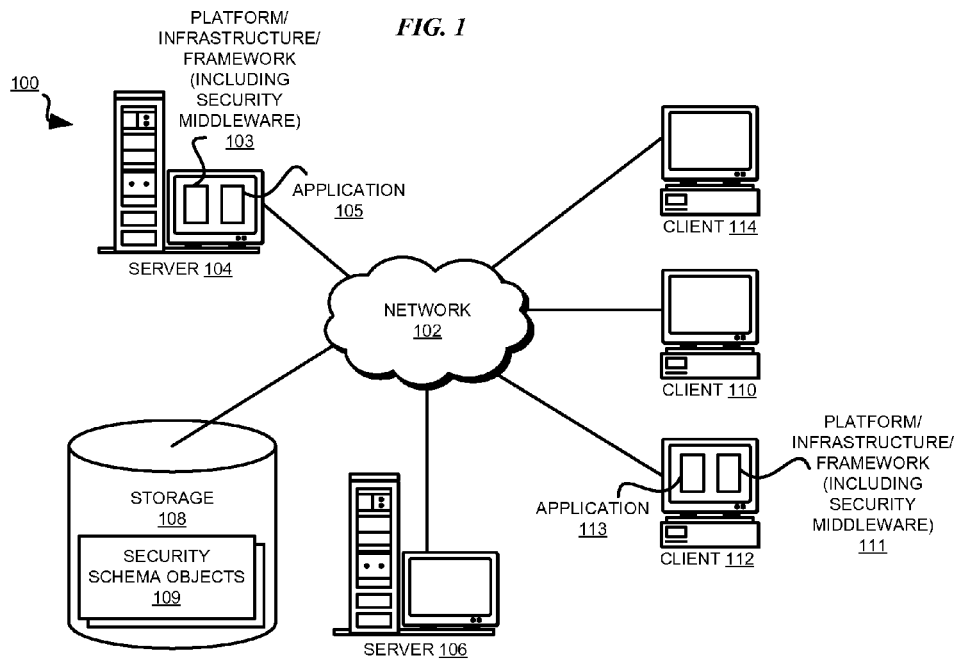
FIG. 1 depicts a pictorial representation of a network of data processing systems in which illustrative embodiments may be implemented.

Modern computer applications use security controls and countermeasures to support the correct the operation of the application, and to protect the data and information that the applications process. Presently available data processing systems include runtime services, such as implementations of algorithms and data manipulation subroutines or functions. Presently available data processing systems also include platform services, such as hardware or firmware encryption processors, key storage, and other such services available to components using a given platform.

There are ongoing and major challenges in designing, building, deploying, and maintaining applications and related security controls and countermeasures. These challenges include, for example, the complexity in combining the security related runtime services into effective security controls and countermeasures. As another example, another challenge is the complexity in coordinating security controls and countermeasures in distributed computing environments, where distributed applications and services, such as an originating application, have to be aware of the security context of the remote application or service, such as a consumer application. As another example, another challenge is that security controls and countermeasures change over time, requiring redesign, recoding or re-compiling of originating and consumer applications.

Presently, information protection services in a computer application perform a series of input, processing and output operations. The processing operations may include data parsing, transformation and formatting. These processing operations may also include cryptographic operations, such as encryption, decryption, cryptographic hashing and signing, and signature validation for the purpose of confidentiality, integrity and non-repudiation.

Presently, application programs directly interface with parsing, transformation, formatting and cryptographic operations implemented within the application's code, or as provided by the hardware, operating system or runtime environment of the local computing platform or a remote service. The inventors recognized many shortcomings of such implementations of application programs with embedded formatting and cryptographic services, or direct interfaces to runtime security related runtime services or platform services.

As an example, presently when these cryptographic services have to be upgraded, the application code has to be modified and re-compiled. As another example, when one application has to communicate with a second application, both applications have to implement a compatible set of parsing, transformation, formatting and protection operations, even though the two applications may reside on different computing hardware and software platforms, with differing runtime and platform services available to them.

A secure structured data object, a security schema, and a security schema object are described in the disclosure that is incorporated by reference herein. Presently, data can be secured while the data is at rest, such as by encryption on a hard disk drive, and while the data is in motion, such as by encryption during transmission or transmission over a secured channel. The inventors recognized that presently, securing distributed data is neither adequate nor transparent enough to be readily implemented.

For example, as data is transformed, packaged, or moved using software applications or services in a distributed computing environment, one of the "data at rest" or "data in motion" methods are adapted to secure the data. In other words, the inventors recognized that the data, or the object the data is contained in, is not secure in itself during such distributed operations but depends on another security measure adapted from another purpose.

Data at rest, and data in motion protection are supported by many security toolkits, frameworks and embedded functions, such as, for example, J2EE/J2SE Standards, OpenSSL tool, Java WS Security standard, framework applications, XML Signing API, and XML Encryption API. However, protecting distributed data requires integrating many individual security toolkits and frameworks, which generally provide low-level security functions for data at rest or data in motion applications. This integration requires skills and security understanding that is beyond the average application developer.

The consequences of such implementations are that the resulting custom application code becomes difficult to analyze and maintain, the custom application code consequently becomes difficult to trust, custom data structures limit interoperability of the applications, and security tools become embedded in software applications and become difficult to locate and maintain. Other consequences include loss of protection and tracking of encryption, signing keys, or validation certificates, and unmanaged potential migration of keys and algorithms, for example, SHA1 to SHA256.

Secure structured data objects according to an embodiment are designed such that the data can remain secure without relying on external security methods for data at rest or data in motion. Secure structured data objects, as described elsewhere in the disclosure, can then participate in a distributed computing environment with or without further security during storage or transmission of those objects.

The inventors further recognized that at present, applications designed to handle encrypted structured data have to accommodate a reasonably large number of popular security methods to be sufficiently inter-operable. Consequently, adding cryptographic protections to structured data objects causes increase in the complexity of the software that create or consume such structured data objects.

The inventors further recognized that data security technologies evolve and change over time. Present software designed to handle secure structured data objects has to be modified to address any changed security implementation of the structured data objects. The software has to also remain backwards compatible with sources of structured data objects that may not adopt a changed standard. These types of issues give rise to increasing complexity of the software, diverting more and more resources of the software away from the central function of processing structured data objects and towards data security issues.

The inventors further recognized that for these and other similar reasons, application developers have to be aware of the security measures that have to be implemented with respect to certain data. For example, presently, an application creates a structured data object using several data input parts. For the application to secure that structured data object, to form a secure structured data object as described elsewhere in the disclosure, an application developer has to become involved with the specific security implementation. In other words, the developer has to know what is included in the security schema object and how to apply that security schema object to a data input part to cause to application to generate the secure structured data object.

Even when a protection utility and a restore utility, as described elsewhere in the disclosure, are available to perform the securing and restoring functions on a structured data object, those utilities have to be specifically designed to operate in the application's environments. Thus, a security administrator, whose job it is to administrate data security in a data processing environment, such as by designing security schemas, has to become involved with the specifics of the application implementations that will use those schemas or schema objects.

Thus, the application developer has to know how to invoke those specifically designed utilities in each data processing environment configuration, and the security administrator has to know how various applications will invoke the protection and restore utilities and use the security schema objects. Consequently, in the process of utilizing secure structured data objects according to the disclosure, the responsibilities of application developers and security administrators can become intertwined.

Furthermore, there are instances when clear data, or data in raw form, should not be available to an application or application developer. A secure structured data object as described elsewhere in the disclosure does accept transformed data and re-transforms that data for inclusion in the secure structured data object. However, because of the overlap between the application developer's responsibility and the security administrator's responsibility, it is conceivable that the application or the application developer can gain access to the clear data during the re-transformation process. For example, an application or application developer can gain access to the clear data by manipulating a security schema object being used to re-transform the data.

The inventors recognized that separation of responsibilities between application developers and security administrators is desirable. The inventors further recognized that isolation of an application's implementation from the security implementation of secure structured data objects is also desirable. The inventors further recognized that ability to hide from an application or application developer the fact that a data input part is not clear data is desirable in some instances.

The illustrative embodiments used to describe the invention generally address and solve the above-described problems and other problems related to data security of structured data objects. The illustrative embodiments provide a method, computer usable program product, and data processing system for providing consistent cryptographic operations across several applications using secure structured data objects.

The illustrative embodiments provide an information protection middleware, or a system of security middleware that provides a structure for the security related functions and services in a data processing system. An embodiment includes security middleware that further provides a structured interface between the application and the security services and provides for consistent orchestration of the security functions and services on behalf of the application. A security middleware according to an embodiment also provides isolation between the application and the security functions and services, such that future changes to security controls and countermeasures does not require redesign, recode or recompile of the application code. By using an embodiment of the invention, a simplified way is available to an average programmer to incorporate advanced cryptographic data protections into applications, as well as many additional features and advantages.

As some examples, in one embodiment, a security middleware may be all or part of a platform with platform services that support security controls and countermeasures. This security middleware and components associated therewith offer a simplified way for the average programmer to incorporate advanced data protections into application software. Furthermore, the security middleware is metadata driven so that the security protections can be migrated over time without requiring recompile of the application programs, for example, when new algorithms or key lengths are prescribed in the data processing environment.

As shown and described with respect to the figures, an embodiment allows for an application program to be designed and built with a standard call to security middleware that may be either on the local data processing system or on a remote system. The security middleware accepts as input, one or more data items, and a set of meta-data, e.g., security schema objects, that describes the operations to be performed using the data input, and information about the data needed to perform those operations. The security middleware returns output data with protections as described in the meta-data, e.g., the security schema object.

Thus, an embodiment provides consistent implementation of security controls and countermeasures in multiple computer systems and computer application programs across a compatible security middleware available to those systems and applications, through which the systems and applications can share the meta-data.

An embodiment provides security related middleware and security middleware components that provides a structure for consistently providing cryptographic operations, such as the security related functions and services, in a data processing environment. An embodiment further provides a structured interface, such as an application programming interface (API) between several applications and the security services. An embodiment further provides consistent cryptographic operation, to wit, orchestration of the security functions and services on behalf of the several applications, such as the originating applications and the consumer applications. An embodiment further provides isolation between the applications and the security functions and services, such that future changes to security controls and countermeasures do not require redesign, recode or recompile of the application code.

An embodiment of the invention enables software that uses structured data objects to remain unaware of the security implementation used for constructing or restoring secure structured data objects. An embodiment similarly enables a security administration function to remain unaware of the various application implementations while managing security schemas and security schema objects that participate in secure structured data objects.

An embodiment further isolates the details of the security implementation in a portable form. For example, using an embodiment, the way a protection utility operates in one data processing environment is customized for applications executing in that data processing environment without having to modify the implementation of the utility or the security schema objects.

An embodiment provides different ways of interfacing with the security implementation, the portable detailed security implementation, and tools for configuring the security implementation as needed. An embodiment of the invention further allows a data processing environment to implement changes to security infrastructure without having to make code changes to numerous software applications that provide or consume secure structured data objects.

The illustrative embodiments are described with respect to data, data structures, and identifiers only as examples. Such descriptions are not intended to be limiting on the invention. For example, an illustrative embodiment described with respect to XML can be implemented using another language or technique for implementing structured data objects in a similar manner within the scope of the invention.

Furthermore, the illustrative embodiments may be implemented with respect to any type of data processing system. For example, an illustrative embodiment described with respect to a multiprocessor standalone data processing system can be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, middleware, or a combination thereof.

An application implementing an embodiment can take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, an embodiment of the invention can be implemented. (Java, JVM, EJB, and other Java related terminologies are registered trademarks of Sun Microsystems, Inc. or Oracle Corporation in the United States and other countries.)

An illustrative embodiment can be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular framework, infrastructure (platform or middleware), only as an example for the clarity of the description. The illustrative embodiments can be used in conjunction with other comparable or similarly purposed frameworks, infrastructures, platforms, middleware, structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
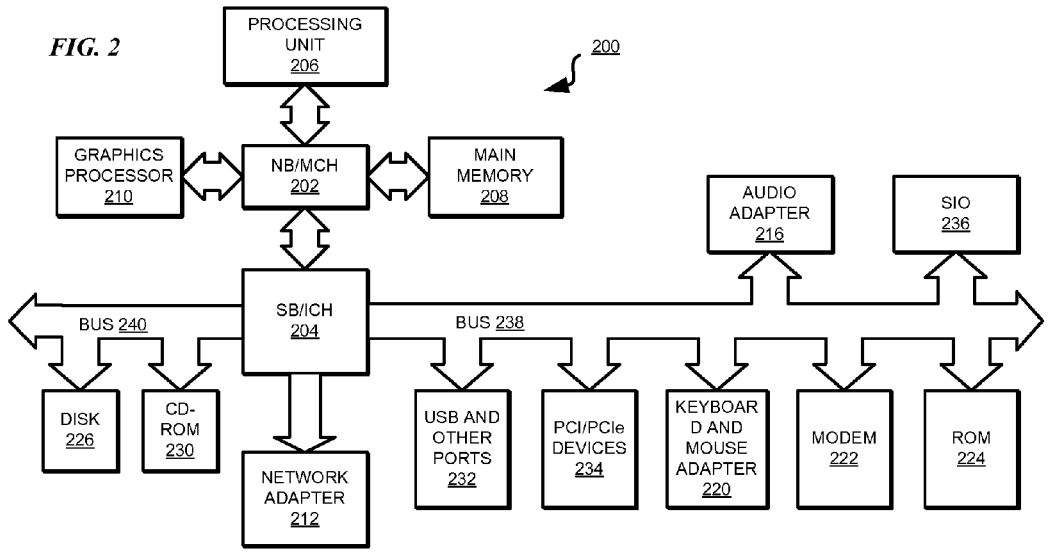
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments can be implemented. FIGS. 1 and 2 are only examples and are not intended to assert or imply any limitation with regard to the environments in which different embodiments can be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments are implemented. Data processing environment 100 includes network 102. Network 102 is the medium used to provide communications links between various devices and computers connected together within data processing environment 100. Network 102 includes connections, such as wire, wireless communication links, or fiber optic cables. Server 104 and server 106 couple to network 102 along with storage unit 108. Software applications can execute on any computer in data processing environment 100.

In addition, clients 110, 112, and 114 couple to network 102. A data processing system, such as server 104 or 106, or client 110, 112, or 114 contain data and have software applications or software tools executing thereon.

Server 104 uses framework 103. Framework 103 is a platform, infrastructure, or operating framework that provides software services or functions for enabling data security related software execution on server 104. Such platforms, infrastructures, operating frameworks, or other similarly purposed architectures are collectively referred to as "security middleware" within this disclosure. Server 104 includes application 105. Application 105 is an application that produces secure structured data objects, consumes secure structured data objects, or both. Storage 108 is a repository of security schema objects 109. Client 112 uses security middleware 111. Client 112 also includes application 113. Application 113 is an application that produces secure structured data objects, consumes secure structured data objects, or both.

Servers 104 and 106, storage unit 108, and clients 110, 112, and 114 can couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3A:
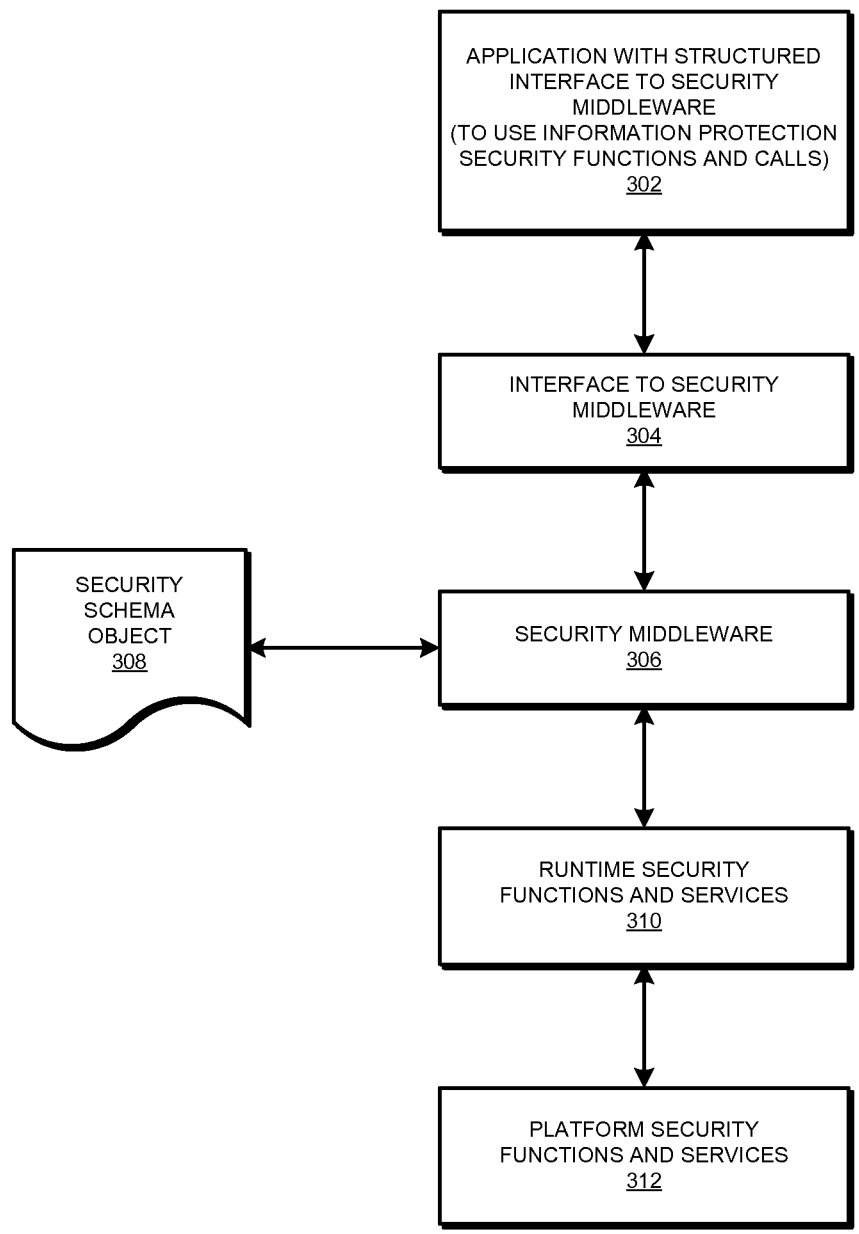
FIG. 3A depicts a block diagram of a data security configuration for separation of responsibilities using structured data objects in accordance with an illustrative embodiment.

With reference to FIG. 3A, this figure depicts a block diagram of a data security configuration for separation of responsibilities using structured data objects in accordance with an illustrative embodiment. Application code 302 is the code of an originating application that has to produce or consume structured data objects, such as code for application 105 or 113 in FIG. 1.

Application 302 relies on security middleware 306 to orchestrate the available security related parsing, transformation, formatting and protection code. Programming or service interface 304 is used by the application 302 to invoke underlying security middleware 306. Application 302 provides input data and receive output data from security middleware via interface 304. Security middleware 306 includes a method, such as a database interface, for receiving security schema object 308 that provides the information and data necessary for the security middleware to perform the desired operation. Security middleware 306 accepts the input data, examines security schema object 308 for integrity, validates any policies and authorizations defined in security schema object 308, applies the defined parsing, transform, formatting and protection operations to the input data object, and returns the transformed output data and return code to calling application 302.

Security middleware utilizes runtime security functions and services 310 that may be available in the data processing system or from third parties. Security middleware also utilizes platform security functions and services 312 that may be available from a given platform.

Figure 3B:
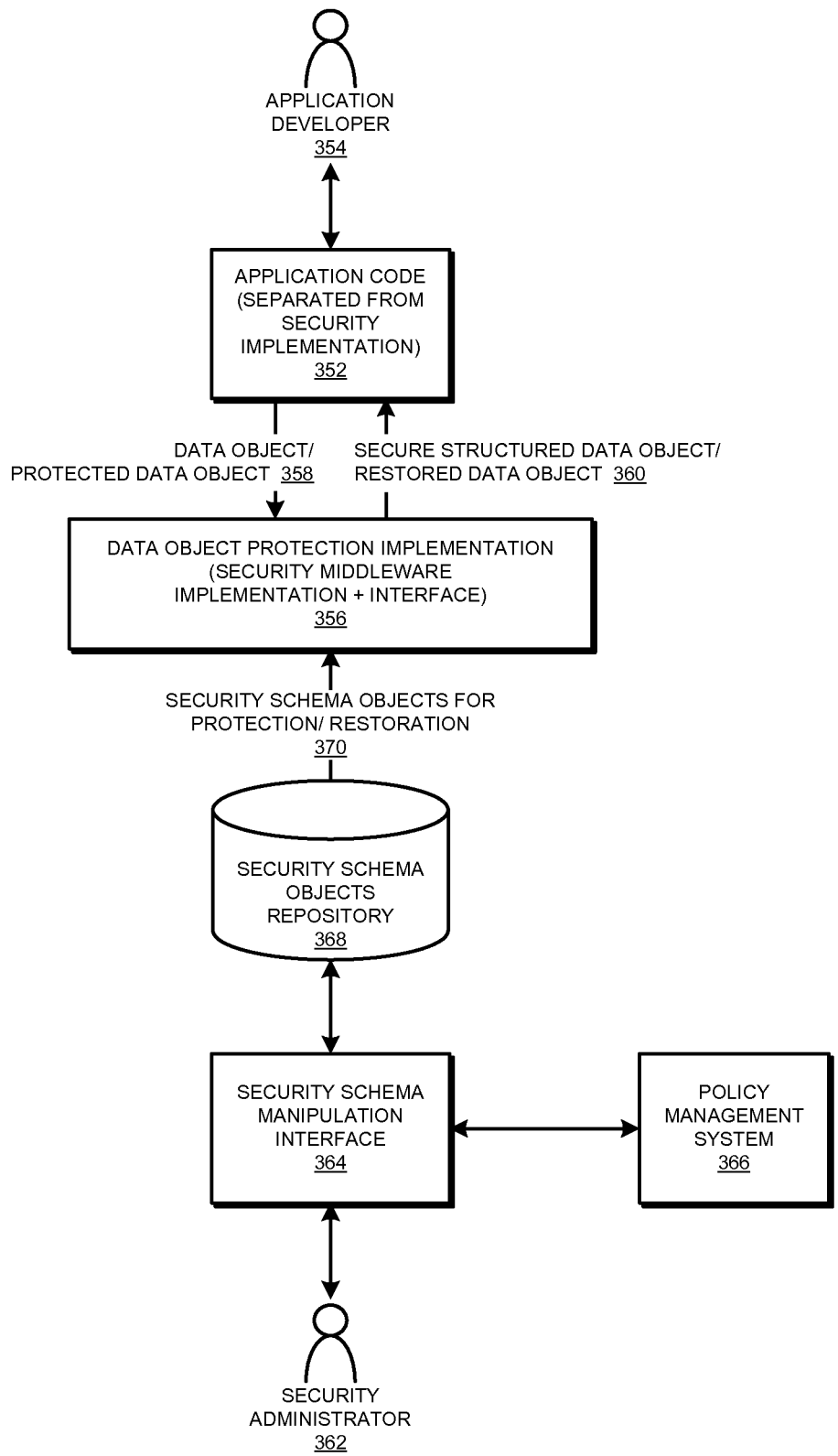
FIG. 3B depicts a block diagram of a data security configuration for separation of responsibilities using structured data objects in accordance with an illustrative embodiment.

With reference to FIG. 3B, this figure depicts a block diagram of a data security configuration for separation of responsibilities using structured data objects in accordance with an illustrative embodiment. Application code 352 is the code of an originating application that has to produce or consume structured data objects, such as code for application 302 in FIG. 3A. Application developer 354 is a developer who writes or otherwise manipulates application code 352.

According to an embodiment, application code 352 can be written such that application code 352 need not depend on the details of the security implementation data security in a distributed data processing environment. For example, application code 352 can be written such that the corresponding application can execute in different data processing environments where different methods for securing structured data objects are in use. Furthermore, application of application code 352 can distribute its own functionality, utilize distributed services over a data network, or perform a combination thereof, such that the structured data objects used in such distributed operations are secured without depending on the security of the structured data objects at rest or in motion.

Data object protection implementation 356 is a security middleware specific implementation of an embodiment. Data object protection implementation 356 provides an interface for protecting structured data objects to form secure structured data objects. Such a "protection interface" is consistent with and published according to the interface specification of the security middleware to enable applications to use the security middleware, including the protection interface.

Data object protection implementation 356 further provides an interface for restoring secure structured data objects to data objects or data parts there from. Such a "restoration interface" is also consistent with and published according to the interface specification of the security middleware to enable applications to use the security middleware, including the restoration interface.

As an example, application code 352 can be a producer of structured data objects. Application code 352 can be configured to call 358 protection interface of data object protection implementation 306 with a data object. Data object protection implementation 356 returns 360 a secure structured data object. Application code 352 need only know the published protection interface of data object protection implementation 356. Application code 352 will know how to utilize the protection interface without any custom security implementation specific coding because of the interface publication mechanism already present in the security middleware of data object protection implementation 356.

As an example, application code 352 may now be a consumer of structured data objects. Application code 352 can be configured to call 358 restoration interface of data object protection implementation 356 with a secure structured data object. Data object protection implementation 356 returns 360 all or part of a restored data object based on policies or authorizations of application code 352, application developer 354, or a combination thereof. Again, application code 352 need only know the published restoration interface of data object protection implementation 356. Application code 352 will know how to utilize the restoration interface without any custom security implementation specific coding because of the interface publication mechanism already present in the security middleware of data object protection implementation 356.

As a specific example, data object protection implementation 356 is an implementation of the Java framework within which application code 352 is designed to execute. Java framework already publishes the interfaces for using the various functions available within a particular implementation of the framework. The protection interface in data object protection implementation 356 is an application programming interface (API) to a protection utility according to an embodiment implemented within the Java framework implementation. The restoration interface in data object protection implementation 356 is an API to a restore utility according to an embodiment implemented within the Java framework implementation.

Security administrator 362 is an administrator responsible for administrating data security in the data processing environment of FIG. 3B. Security administrator 362 uses security schema manipulation interface 364 to create, delete, change, or otherwise manipulate security schemas, security schema objects, and other related security artifacts in the data processing environment. For example, security schema manipulation interface 362 interacts with policy manipulation system 366 to allow security administrator 362 to manipulate security policies.

Security schema manipulation interface 364 stores, deletes, updates, modifies, or otherwise manipulates security schema objects repository 368. Security schema objects 370 from repository 368 participate in the protection of structured data objects and restoration of secure structured data objects.

As a specific example, the protection and restore utilities can be implemented as Java extensions to an existing Java based software product executing in a Java framework implementation 356. Call 358 to a protection API in Java framework implementation 356 with a structured data object causes the protection utility of the protection API to access a security schema object in repository 368. Similarly, call 358 to a restore API in Java framework implementation 356 with a secure structured data object causes the restore utility of the restoration API to find a reference to a security schema object in the secure structured data object. The restore utility implementation then accesses the referenced security schema object in repository 368.

Thus, the configuration of FIG. 3B offers several advantages. Application code 352 can be separated from the details of the implementation of security of structured data objects. Application code 352 need only know how to invoke an interface offered by a security middleware to accomplish securing a structured data object and recovering data from a given secure structured data object. The responsibilities of an application developer and a security administrator are separated such that neither of them has to understand or depend on the details of the other's implementation.

Such a security middleware-based implementation is not limited to providing only the protection and restoration functions. Additional functions, such as application authentication, data verification and validation, error detection and correction, and many other features usable in packaging structured data objects can similarly be provided from such an implementation within the scope of the invention. Only as examples, some of these features are described elsewhere as features of the protection and restore utilities, and can be provided through these utilities' interfaces or separate interfaces in a similar manner.

Separation of responsibilities that is achieved in such security middleware-based implementation also encapsulates cryptography management for application developers and separates use of data protection mechanisms from security definition. The security configuration of security schema objects becomes changeable or upgradeable without requiring changes in the application.

Furthermore, such an implementation of an embodiment reduces the risk of pass phrases, keys, and certificates being lost or stolen. Implemented in this form, the concrete implementation of an embodiment becomes transportable across different platforms and runtime environments.

In one embodiment, the role and responsibilities of the security administrator can be further subdivided. The responsibilities can be further separated into a security architect role and a security deployment role, thereby further providing further separation of responsibilities. The security architect may design the security schema and provision the encryption algorithms, certificates, keys, and passphrases across a data processing environment. The security deployment role may match the security schema and other security assets to specific applications' needs, such as by constructing specific security schema objects and populating the repository with those objects.

Figure 4A:
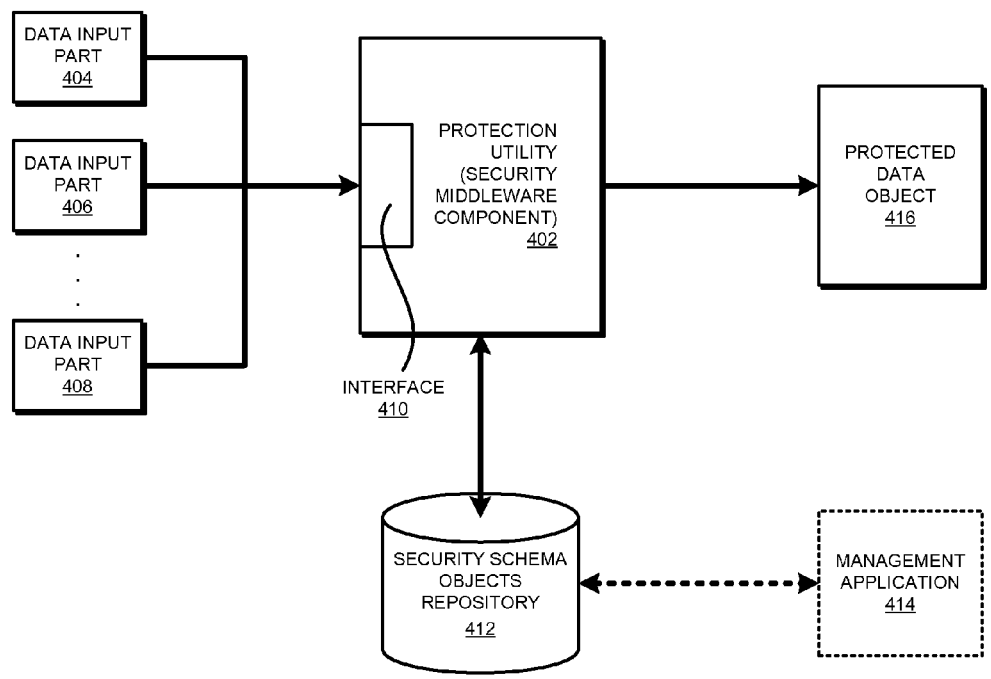
FIG. 4A depicts a block diagram of a security configuration for providing consistent cryptographic operations in a data processing environment using protected structured data objects in accordance with an illustrative embodiment.

With reference to FIG. 4A, this figure depicts a block diagram of a security configuration for providing consistent cryptographic operations in a data processing environment using protected structured data objects in accordance with an illustrative embodiment. Protection utility 402 can be an application implemented in any form, including but not limited to a plug-in. In one example embodiment, protection utility is implemented within a security middleware implementation, such as implementation 356 in FIG. 3B, and offered to several applications via an API.

Each of data input parts 404, 406, and 408 is data that has to be included in a structured data object. Data input parts 404-408 may be any number of such data. Furthermore, in an embodiment, data input parts 404-408 each come from different sources, such as different originating applications, and are of any type without limitation. For example, in one embodiment, a user provides data input part 404, an application provides data input part 406, and data input part 408 is computed. Any type of data is usable in the manner of any of data input parts 404, 406, or 408, and any number thereof without limitation. For example, any of data input parts 404-408 can be plain text data from a user, a data structure parameter provided by an application, XML data received over a network, Standard Generalized Markup Language (SGML) document produced from a server, or a query code generated by a database. As some more examples, a data input usable as data input part 404, 406, or 408 can be a text or binary file encrypted using a public key in key pair cryptography, a key usable for encryption or decryption, a certificate usable for authentication, data having a checksum, or a seed value for cryptographic key generation.

The sources of data input parts 404-408 provide data input parts 404-408 to protection utility 402 via interface 410. Interface 410 can be a user interface or an application interface, such as an API. In one embodiment, interface 410 is a service provider's API, such as a web-service interface published by a web-services provider.

Protection utility 402 communicates with repository 412. Repository 412 may be any type of data storage configurable to store security schema objects. Repository 412 may have associated therewith management application 414. Management application 414 allows manipulation of security schema objects in repository. As an example, management application 414 can be a part of security schema manipulation interface 364 accessible to security administrator 362 in FIG. 3B.

Using data input parts 404-408, and one or more security schema objects from repository 412, protection utility 402 produces protected data object 416. Protected data object 416 is a structured data object that includes one or more security measures associated with one or more parts of the structured data object. In applying a security measure to a part of protected data object 416, protection utility 402 uses services and data from other applications or data processing systems (not shown).

Protected data object 416 references the associated one or more security schema objects used in protected data object 416's creation. In one embodiment, this referencing is accomplished by including the one or more security schema objects within protected data object 416 as properties of protected data object 416. For example, in an embodiment, protected data object 416 includes not only the structured data resulting from applying the contents of a security schema object to data input part 404, but also the security schema object itself.

In another embodiment, referencing a security schema object from protected data object 416 is accomplished by storing a reference within protected data object 416, the reference pointing or leading to the a security schema object store external to protected data object 416. For example, in an embodiment, protected data object 416 includes not only the structured data resulting from applying the contents of a security schema object to data input part 406, but also an address to the security schema object itself. When a receiver unpacks protected data object 416 to recover data input part 406, the address is utilized to retrieve the associated security schema object from another location in a data processing environment, such as over a data network. In such an embodiment, the address referencing the externally stored security schema object is a property of protected data object 416.

Note that an embodiment may include a combination of types of references to different security schema objects. For example, in an embodiment, protected data object 416 includes transformed version of data input part 404, the security schema object usable for recovering data input part 404, transformed version of data input part 406, and a reference to an externally stored security schema object usable for recovering data input part 406.

Figure 4B:
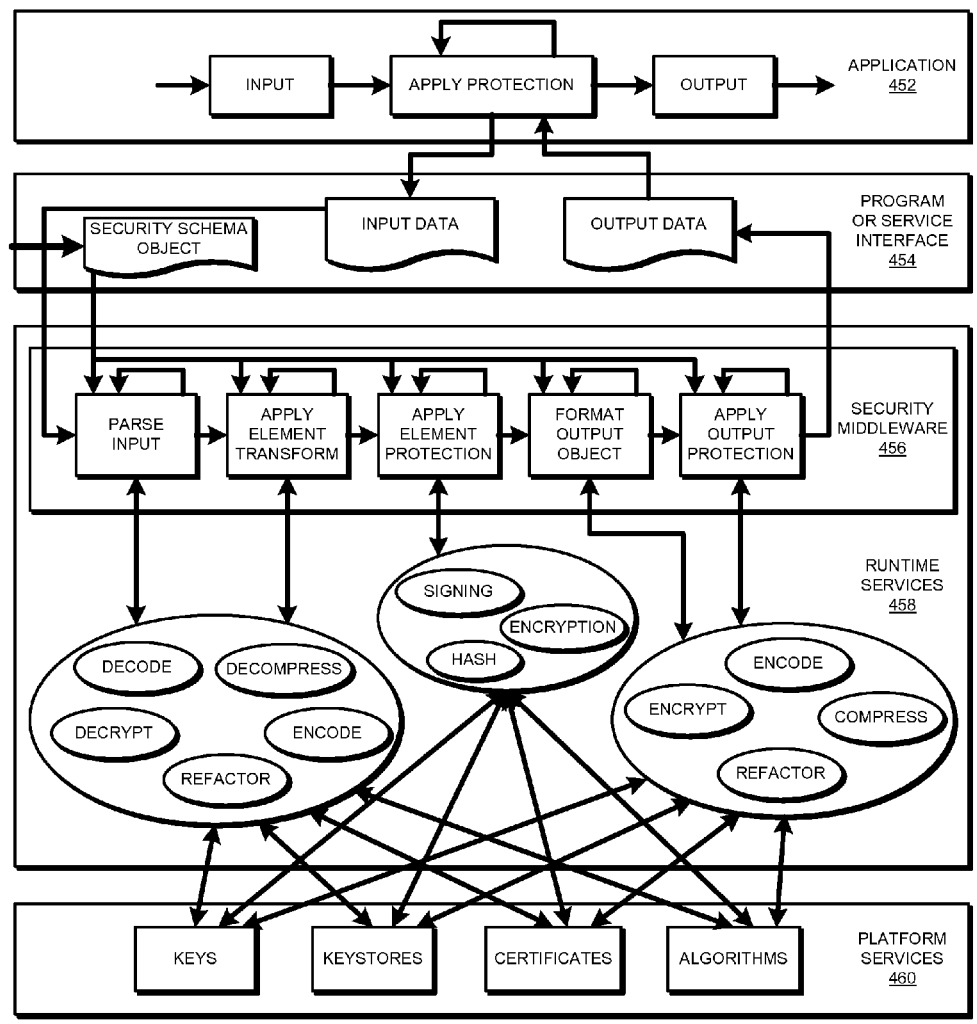
FIG. 4B depicts a block diagram of a security configuration for providing consistent cryptographic operations in a data processing environment using protected structured data objects in accordance with an illustrative embodiment.

With reference to FIG. 4B, this figure depicts a block diagram of a security configuration for providing consistent cryptographic operations in a data processing environment using protected structured data objects in accordance with an illustrative embodiment. Application 452 is similar to application 302 in FIG. 3A or application code 352 in FIG. 3B.

Security middleware 406 is made available to application 452 via interface 454. Application 452 receives data input and calls interface 454 with input data to apply protection. Using input data and one or more security schema objects, security middleware 456 parses the input, applies transformations and protections there to, formats the output data, and applies any further protection to the output data. The output data is returned to application 452 via interface 454.

In performing the described operations, security middleware 456 utilizes runtime services 458, such as encryption/decryption services, hashing, signing, compression/decompression, or refactoring services. Some of runtime services 458 further utilize platform services 460, such as keystores, encryption algorithms, certificate repositories and the like.

Figure 5A:
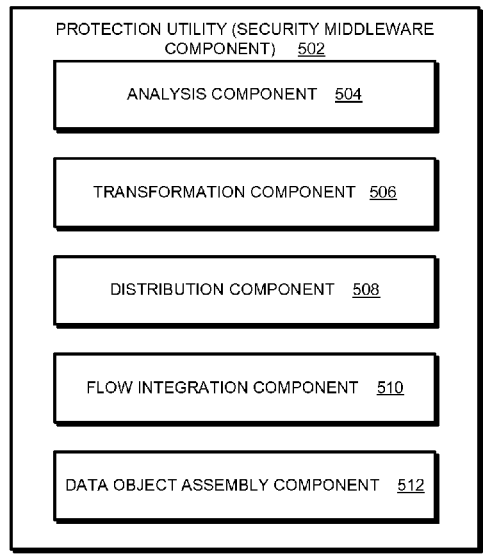
FIG. 5A depicts a block diagram of an example configuration of a protection utility in accordance with an illustrative embodiment.

With reference to FIG. 5A, this figure depicts a block diagram of an example configuration of a protection utility in accordance with an illustrative embodiment. Protection utility 502 can be used as protection utility 402 in FIG. 4A.

In the depicted example configuration, protection utility 502 includes analysis component 504, transformation component 506, distribution component 508, flow integration component 510, and data object assembly component 512. Analysis component 504 analyzes a data input part being provided by a source, a security schema object received from a security schema object repository, and other inputs, such as administrative or data-security policies, for creating a structured data object. Analysis component 504 can pre-process or otherwise manipulate information, such as a data part or a security schema object, in an embodiment.

Transformation component 506 performs the transformations according to a security schema object. In one embodiment, transformation component 506 communicates with other applications or data processing system, such as to receive rules, policies, or other information usable in performing a transformation.

Generally, any operation performed in protection utility 502 can be distributed to or coordinated with other applications or data processing system. Distribution component 508 enables protection utility 502 in so distributing or coordinating the operations. For example, in one embodiment, for performing a signing transformation, transformation component 506 communicates with a certificate database located elsewhere in a data processing environment to receive information of a certificate. Continuing with the signing transformation example, in an embodiment, transformation component 508 further communicates with a third party certificate authority (CA) to determine the validity of the certificate prior to using the certificate.

In another embodiment, analysis component 504 distributes one or more analysis tasks to other processors in a distributed computing environment. The example communication and distribution are not intended to be limiting on the invention. Many other communications and distributions are going to be apparent from this disclosure and the same are contemplated within the scope of the invention.

Flow integration component 510 coordinates the operations of protection utility 502 with any data flow or work flow specified in a given security schema object. For example, in an embodiment, flow integration component 510 causes an analysis operation to wait for a transformation operation to complete successfully.

As another example, a workflow in a business data processing environment may require a notification when a certain transformation fails. in an embodiment, flow integration component 510 causes a message to be sent to the workflow engine in the data processing environment for such workflows to execute correctly. Generally, any data dependency or condition can be encoded into a data flow and can be utilized by flow integration component 510 in this manner.

Protection utility 502 analyzes, transforms, and integrates various parts of a structured data object separately. For example, in one embodiment, protection utility 502 analyzes and transforms a data input part individually. Upon a certain trigger or event, such as all parts having been successfully transformed, protection utility assembles the structured data object from those parts including associated security schema objects or references thereto as properties of the structured data object. Data object assembly component 512 facilitates the assembly of the structured data object according to a specification such as XML or another proprietary or standard specification.

Figure 5B:
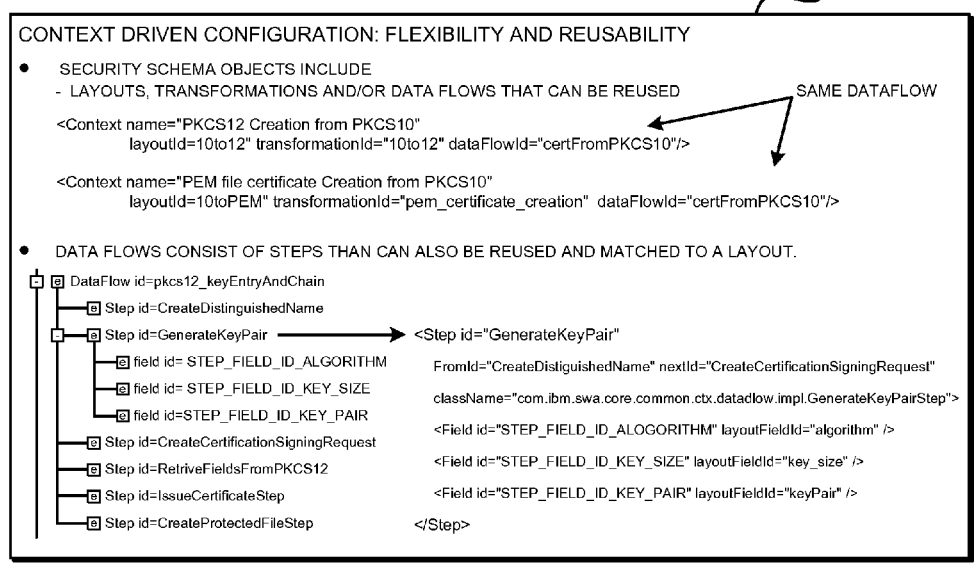
FIG. 5B depicts pseudo-code of an example security schema object in accordance with an illustrative embodiment.

With reference to FIG. 5B, this figure depicts pseudo-code of an example security schema object in accordance with an illustrative embodiment. Security schema object 520 can be used as an input to protection utility 402 in FIG. 4A, such as the security schema object depicted in FIG. 4B.

Security schema object 520 provides simple, consistent instructions to the security middleware. Security schema objects, such as security schema object 520, contain information and data items that relate to the security related operations to be performed at the security middleware. Security schema objects can include the detailed information or a reference to the description of the layout of the input data, the transforms to be performed on the input data, and the sequence of steps to be performed. Security schema objects can also contain detailed information or references to other security-related information, such as policies, identities, cryptographic keys, cryptographic algorithms, PKI certificates, etc., as needed to complete the desired operations, or to ensure the authenticity of the information involved and authorization of the parties and operations involved.

Figure 5C:
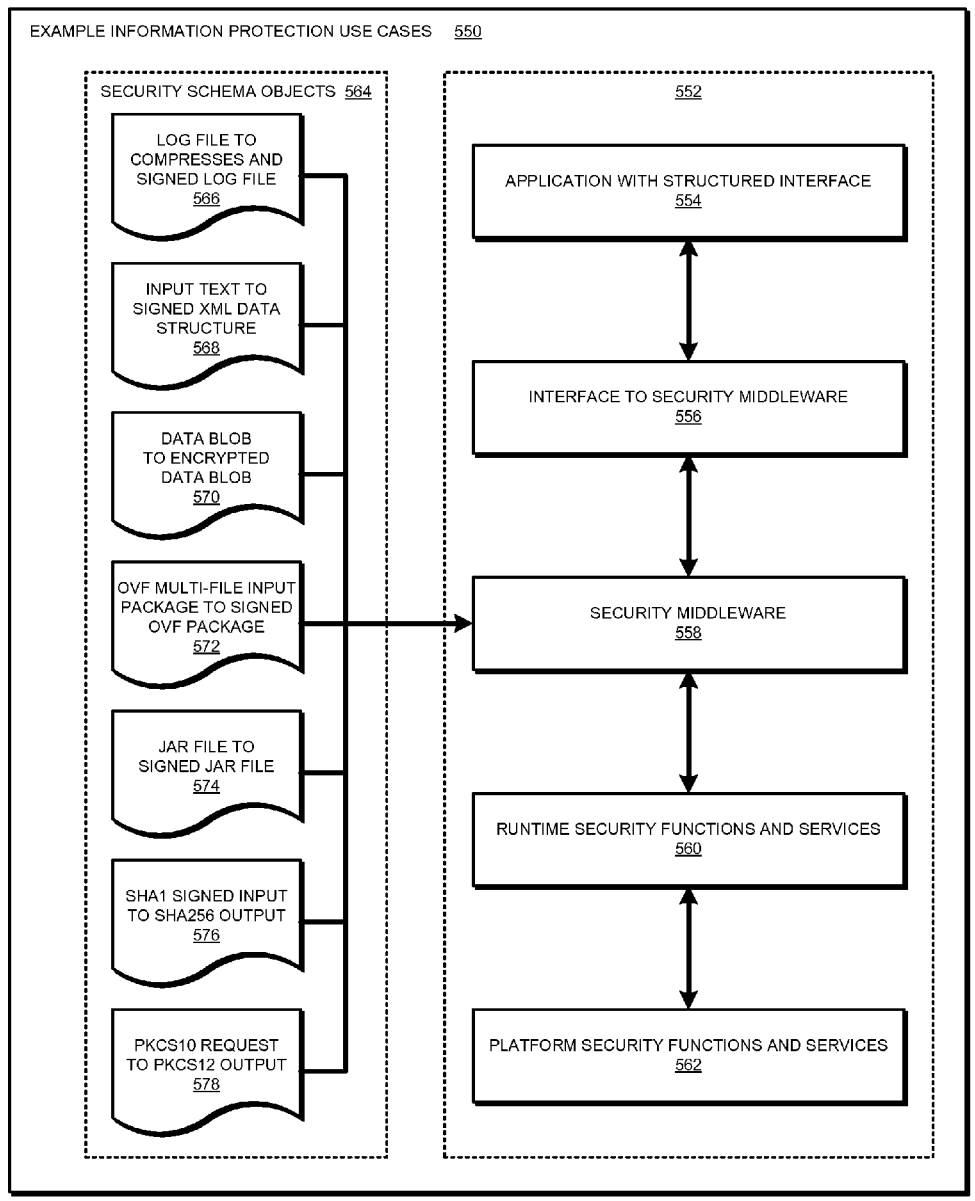
FIG. 5C depicts a block diagram of protection use cases of a data security configuration using security schema objects in accordance with an illustrative embodiment.
Figure 5D:
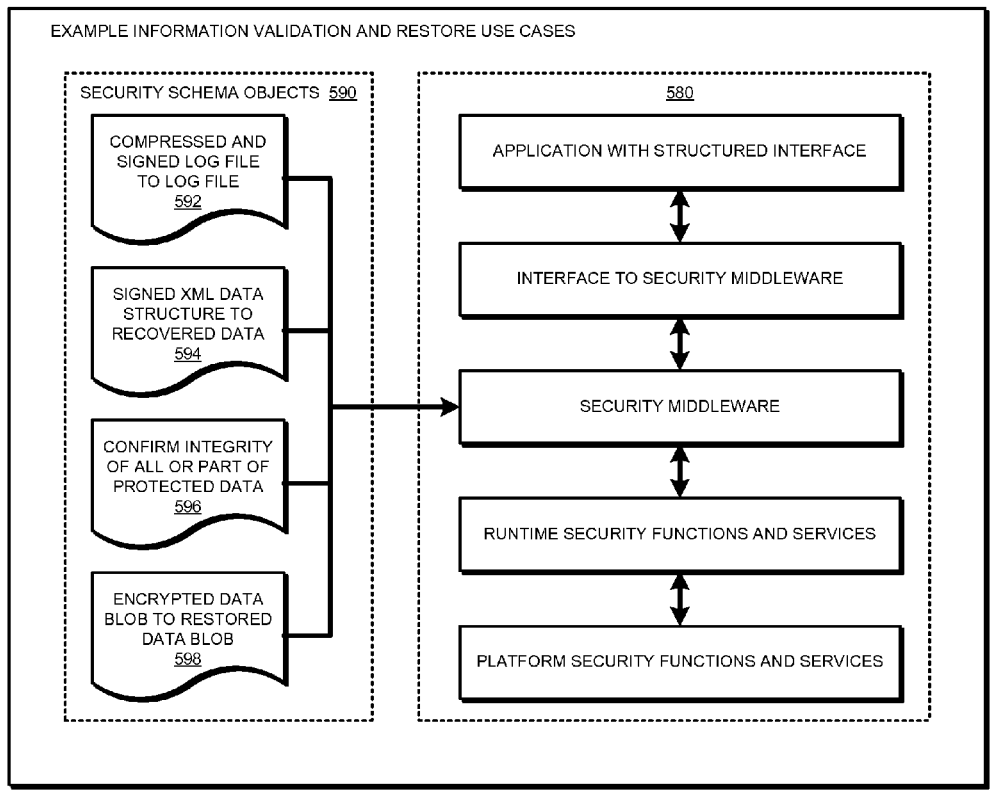
FIG. 5D depicts a block diagram of restoration or validation use cases of a data security configuration using security schema objects in accordance with an illustrative embodiment.

Any number of security schema object variations are possible from this disclosure, as described with respect to some example protection and restoration use cases in FIGS. 5C and 5D. Security schema objects according to an embodiment are easily standardized, published and accessible from public sources, or can be privately managed in order to enhance privacy and confidentiality of the security system and the information that is being protected.

With reference to FIG. 5C, this figure depicts a block diagram of protection use cases of a data security configuration using security schema objects in accordance with an illustrative embodiment. Use cases depiction 550 includes configuration 552, the elements of which correspond to the elements of the data security configuration depicted in FIG. 3A. Application 554 corresponds to application 302, interface 556 to interface 304, security middleware 558 to security middleware 306, runtime services 560 to runtime service 310, and platform service 562 to platform services 312, respectively, in FIG. 3.

Security schema objects 564 includes various security schema objects for example protection use cases. For example, security schema object 566 is a security schema object for converting a compressed log file to a signed log file; security schema object 568 is a security schema object for converting an input text to a signed XML data structure; security schema object 570 is a security schema object for converting a data blob to an encrypted data blob; security schema object 572 is a security schema object for converting an open Virtualization Format (OVF) multi-file input package to a signed OVF package; security schema object 574 is a security schema object for converting a JAR file to a signed JAR file; security schema object 576 is a security schema object for converting a "Sha1" signed input to a "sha256" signed input; and security schema object 578 is a security schema object for converting a Public-Key Cryptographic Standards #10 (PKCS10) PKCS10 request to a Public-Key Cryptographic Standards #12 (PKCS12) PKCS12 output. Of-course, these use cases are only example use cases of a security schema object according to an embodiment. An implementation can combine these and other multiple use cases into a common security schema object within the scope of the illustrative embodiments.

With reference to FIG. 5D, this figure depicts a block diagram of restoration or validation use cases of a data security configuration using security schema objects in accordance with an illustrative embodiment. Elements of configuration 580 correspond to the elements of configuration 552 in FIG. 5C.

Security schema objects 590 includes various security schema objects for example restoration or validation use cases. For example, security schema object 592 is a security schema object for restoring a compressed and signed log file to a log file; security schema object 594 is a security schema object for restoring a signed XML data structure to recovered data; security schema object 596 is a security schema object for confirming identity of all or part of protected data; and security schema object 598 is a security schema object for restoring encrypted data blob to a restored data blob. Of-course, these use cases are only example use cases of a security schema object according to an embodiment. An implementation can combine these and other multiple use cases into a common security schema object within the scope of the illustrative embodiments.

Figure 5E:
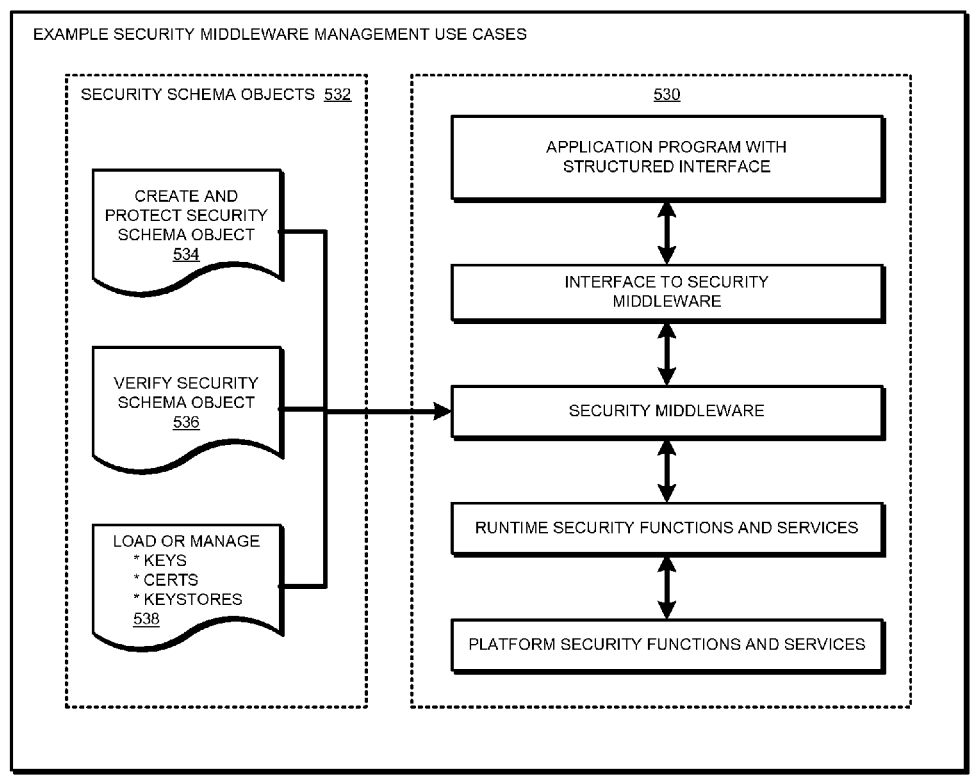
FIG. 5E depicts a block diagram of additional use cases of a data security configuration using security schema objects in accordance with an illustrative embodiment.

With reference to FIG. 5E, this figure depicts a block diagram of additional use cases of a data security configuration using security schema objects in accordance with an illustrative embodiment. Elements of configuration 530 correspond to the elements of configuration 580 in FIG. 5D.

Security schema objects 532 includes various security schema objects for example variety of additional use cases. For example, security schema object 534 is a security schema object that describes the contents and protections for other security schema objects; security schema object 536 is a security schema object for verifying the validity of other security schema objects; and security schema object 538 is a security schema object for providing commands and parameters that describe management operations related to cryptographic keys, certificates, algorithms and keystores to security middleware. Of-course, these use cases are only example use cases of a security schema object according to an embodiment. An implementation can combine these and other multiple use cases into a common security schema object within the scope of the illustrative embodiments.

Figure 6:
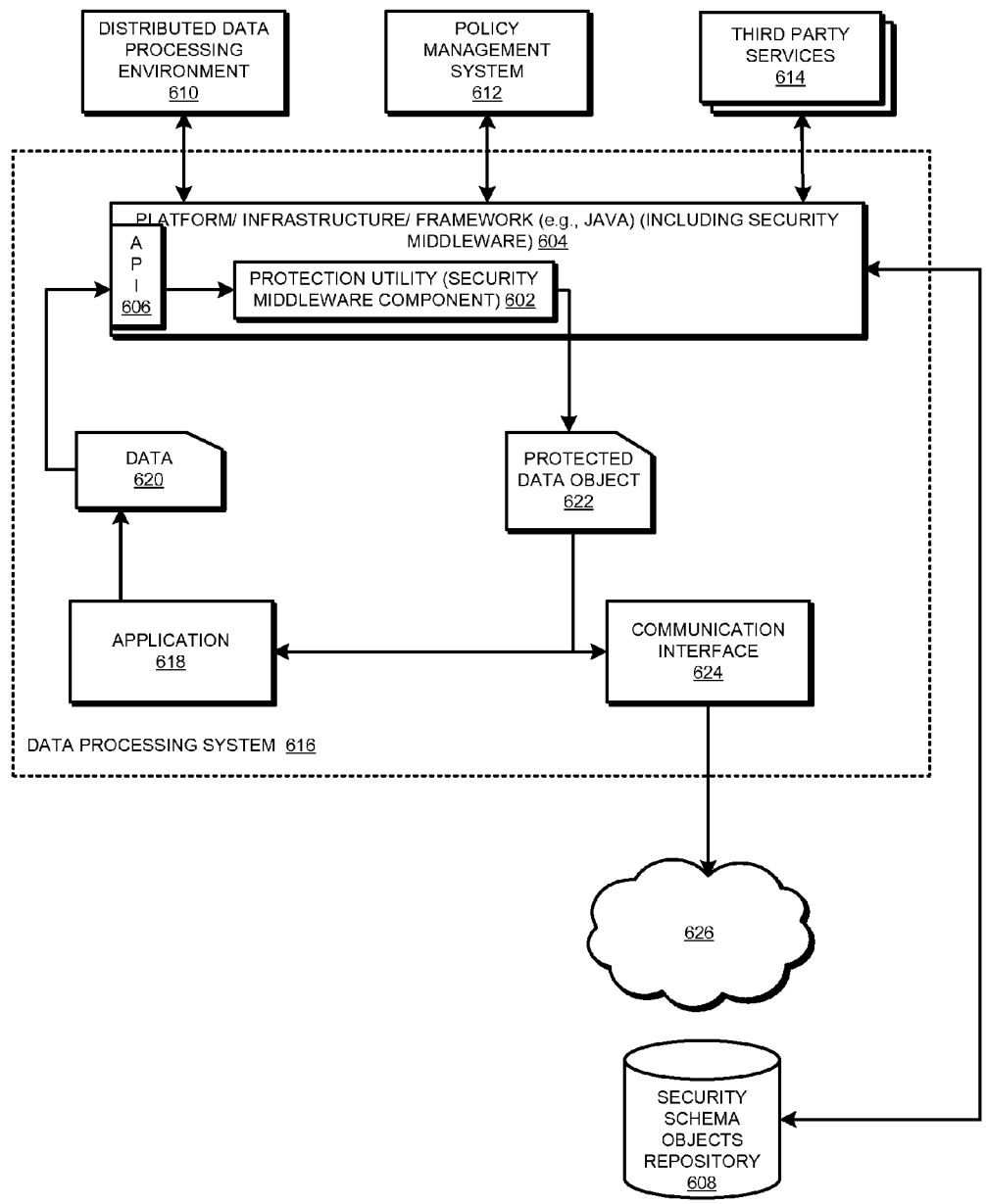
FIG. 6 depicts a block diagram of an example configuration of a protection utility in accordance with an illustrative embodiment.

With reference to FIG. 6, this figure depicts a block diagram of an example configuration of a protection utility in accordance with an illustrative embodiment. Protection utility 602 is usable as protection utility 502 in FIG. 5A.

Protection utility 602 is implemented within security middleware 604 as a security middleware component. Protection utility 602 communicates with an application for protecting a structured data object via API 606.

Security middleware 604 facilitates communication between protection utility 602 and one or more other applications or data processing systems for performing an operation. As an example, protection utility 602 is depicted as being able to communicate with security schema object repository 608, distributed data processing environment 610, policy management system 612, and third party services 614.

Security schema object repository 608 is a security schema object store that provides security schema objects to protection utility 602 via security middleware 604. Distributed data processing environment 610 performs one or more operations of protection utility 602. Third party services 614 provide additional information or services to protection utility 602 for performing an operation of protection utility 602. In one embodiment, some or all of security schema object repository 608, distributed data processing environment 610, policy management system 612, and third party services 614 are implemented as runtime services. In another embodiment, some or all of security schema object repository 608, distributed data processing environment 610, policy management system 612, and third party services 614 are implemented as services in a platform service layer. For example, in one embodiment, some of third party services 614 are cryptographic services, such as encryption services, digital signing services, and hashing services. Furthermore, in an embodiment, for such cryptographic services, the keys, certificates, or other cryptographic information is stored in a platform service layer.

Policy management system 612 provides policies or rules that may be usable in performing an operation of protection utility 602. For example, in an embodiment, a policy provided by policy management system 612 is usable to override or modify a transformation specification in a security schema object. For example, a security schema object may specify a 64-bit encryption for a particular part of a structured data object. A policy may provide that at least 128-bit encryption is to be used for all data leaving the enterprise. Accordingly, protection utility 602 overrides the specified transformation in the security schema object with the policy.

Security middleware 604 executes in data processing system 616. Application 618 is an application according to application code 352 in FIG. 3B, and has data 620 to be secured and structured. Application 618 calls API 606 published by security middleware 604 for protection utility 602. The calling of API 606 results in protected data object 622 being produced from protection utility. Protected data object 622 is a secure structured data object, and is returned to application 618, or communicated via communication interface 624 of data processing system 616 over network 626 to another application.

In a detailed view of the operation of an embodiment, security middleware component 602 (protection utility 602) parses data input 620, which is provided in a specific format. Security middleware component 602 normalizes data 620 and any other similarly provided data inputs according to a layout format. Security middleware component 602 applies one or more transformations according to a security schema object. Data 620 and other elements for forming protected data object 622 are laid out and protected according to the security schema object. Protected data object 622 is packaged for communication to a consumer application. The consumer application unpacks the protected data object using a security middleware component corresponding to a restore utility, and using the security schema object used for packaging protected data object 622. The unpacking operation is described with respect to FIG. 10. Thus, the cryptographic operations used by the originating and consumer applications are consistent through the use of the security schema object and the security middleware component 602.

The security middleware based implementation of protection utility 602 is depicted only as an example for the clarity of the description. Many other configurations of protection utility 602, such as those described with respect to FIG. 7 but not limited thereto, will be apparent from this disclosure. Similarly, many other systems and applications configurable with protection utility 602 in a similar manner will become apparent from this disclosure and the same are contemplated within the scope of the invention.

Figure 7:
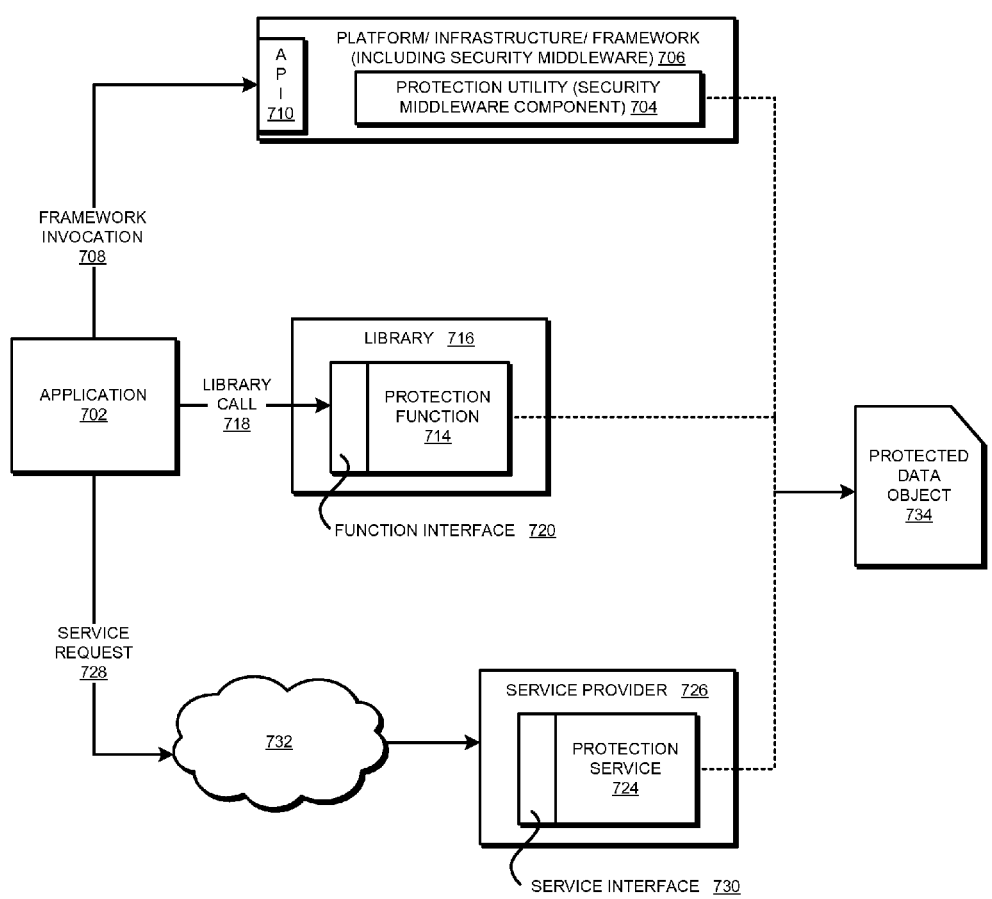
FIG. 7 depicts a block diagram of example alternative implementations for providing consistent cryptographic operations across several applications using structured data objects in accordance with an illustrative embodiment.

With reference to FIG. 7, this figure depicts a block diagram of example alternative implementations for providing consistent cryptographic operations across several applications using structured data objects in accordance with an illustrative embodiment. Application 702 is similar to application 618 in FIG. 6.

A protection utility according to an embodiment, such as protection utility 502 in FIG. 5A, can be implemented or offered for use to application 702 in a variety of ways. For example, in one embodiment, protection utility 704 is implemented in security middleware 706 as a security middleware component. Application 702 invokes 708 protection utility 704's functionality via API 710 published by security middleware 706.

In another embodiment, the protection utility, such as protection utility 502 in FIG. 5A, takes the form of protection function 714 in library 716. As an example, library 716 is a dynamic link library (DLL). Application 702 makes library call 718 to invoke protection function 714's functionality via function interface 720 available from library 716.

In another embodiment, the protection utility, such as protection utility 502 in FIG. 5A, takes the form of protection service 724 from service provider 726. As an example, service provider 726 is a third party web-service. Application 702 make service request 728 to use protection service 724's functionality via service interface 730 published or registered by service provider 726. Application 702 makes service request 728 over data network 732 and service provider 726 is a server that is accessible using data network 732.

Protected data object 734 results from the execution of an implementation of the protection utility. Various implementations of the protection utility are described in FIG. 7 only as examples. These examples are neither intended to be limiting on the invention, nor intended to be implemented in exclusivity with one another within the scope of the invention. In one embodiment, application 702 has access to protection utility 704, protection function 714, protection service 724, or a combination thereof, simultaneously.

Figure 8:
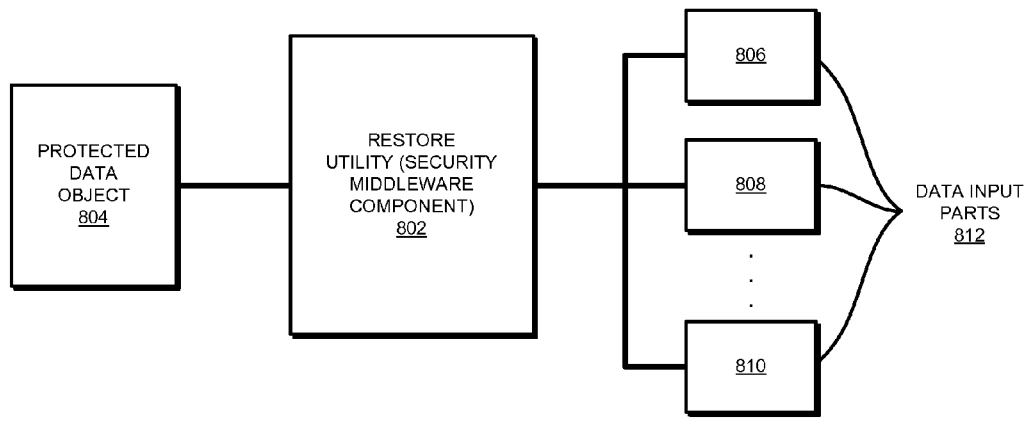
FIG. 8 depicts a block diagram of a security configuration for restoring structured data objects in accordance with an illustrative embodiment.

With reference to FIG. 8, this figure depicts a block diagram of a security configuration for restoring structured data objects in accordance with an illustrative embodiment. Restore utility 802 is an application or a component of an application or security middleware, and can take any other similar form suitable for an implementation. Restore utility 802 is usable in conjunction with an application that consumes secure structured data objects, for example, application 113 in client 112 in FIG. 1.

Restore utility 802 receives protected data object 804. Protected data object 804 is similar to protected data object 622 in FIG. 6. Restore utility 802 performs a validation of protected data object 804. To wit, restore utility 802 establishes that protected data object has not been altered, modified, or tampered with, has not been invalidated, or is in the form expected by the consumer application.

Upon successful validation, restore utility 802 applies transformations to various parts of protected data object 804. The transformations restore the protected parts of protected data object 804 to data input parts 812, e.g., as data input parts 806, 808, and 810. Data input parts 806-810 may be any number of data parts. Restore utility 802 can apply transformations to all or part of protected data object 804 based on policies or authorizations of the requesting consumer application, consumer application's user, or a combination thereof.

In one embodiment, data input parts are the original data parts, such as data input parts 404-408 in FIG. 4A, that were received from one or more sources to create protected data object 804. In another embodiment, data input parts 806-810 are a variation of such original data input parts suitable for consumption at the consumer application, such as after a post-processing is applied to data input parts 404-408 in FIG. 4A that may be recovered from protected data object 804.

Figure 9:
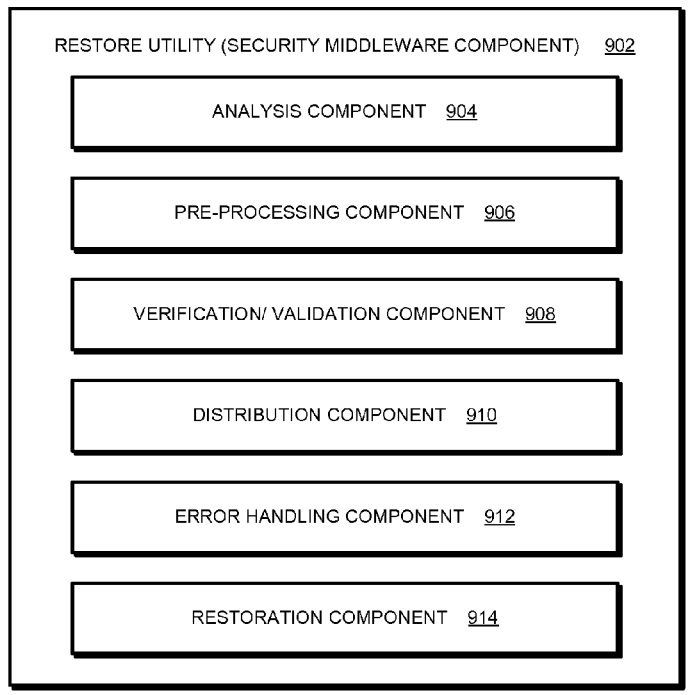
FIG. 9 depicts a block diagram of an example configuration of a restore utility in accordance with an illustrative embodiment.

With reference to FIG. 9, this figure depicts a block diagram of an example configuration of a restore utility in accordance with an illustrative embodiment. Restore utility 902 is similar to restore utility 802 in FIG. 8.

Restore utility 902 includes analysis component 904, pre-processing component 906, validation component 908, distribution component 910, error handling component 912, and restoration component 914. Analysis component 904 performs analysis of a secure structured data object or of the secure structured data object's parts, as provided by pre-processing component 906. With respect to the structured data object and its parts, analysis component 902 operates in a manner similar analysis component 504 in FIG. 5A.

Pre-processing component 906 processes a received secure structured data object. Pre-processing component 906 unpacks the protected data object to the extent that the context (security schema object) is retrieved for further processing of the protected data object. Pre-processing component 906 is used to pre-process a secure structured data object in a similar manner or any purpose suitable for an implementation.

Validation component 908 validates the secure structured data object as a whole, protected parts of the secure structured data object, or a combination thereof. Validity of data being validated can be established in any manner suitable for an implementation without limitation on the invention.

Distribution component 910 distributes one or more operations of restore utility 902 to other applications or data processing systems. Distribution component 910 operates in a manner similar to distribution component 508 in FIG. 5A.

Error handling component 912 operates to address any error conditions experienced during an operation of restore utility 902. For example, if validation component 908 generates an event to indicate an invalid secure structured data object, error handling component 912 can take additional actions, such as notifying the sender of the secure structured data object, or attempting to recover from the cause of the invalidity. Any error handling action can be incorporated into error handling component 912 within the scope of the invention.

Restoration component 914 operates to restore a protected data part of a secure structured data object. In performing the restore operation, restoration component 914 may use other data parts of the secure structured data object, such as one or more security schema objects that can be included as properties of the secure structured data object. In an embodiment, restoration component 914 also utilizes other applications, services, or data, such as an external source of security schema objects using a reference to a security schema object which forms a property of the secure structured data object. In another example embodiment, in restoring a signed data part, restoration component 914 validates the signing certificate from an external certificate authority. Upon successful validation of the certificate from the certificate authority, restoration component 914 proceeds to restore the signed data part using an included security schema object to a form usable at a consumer application.

Figure 10:
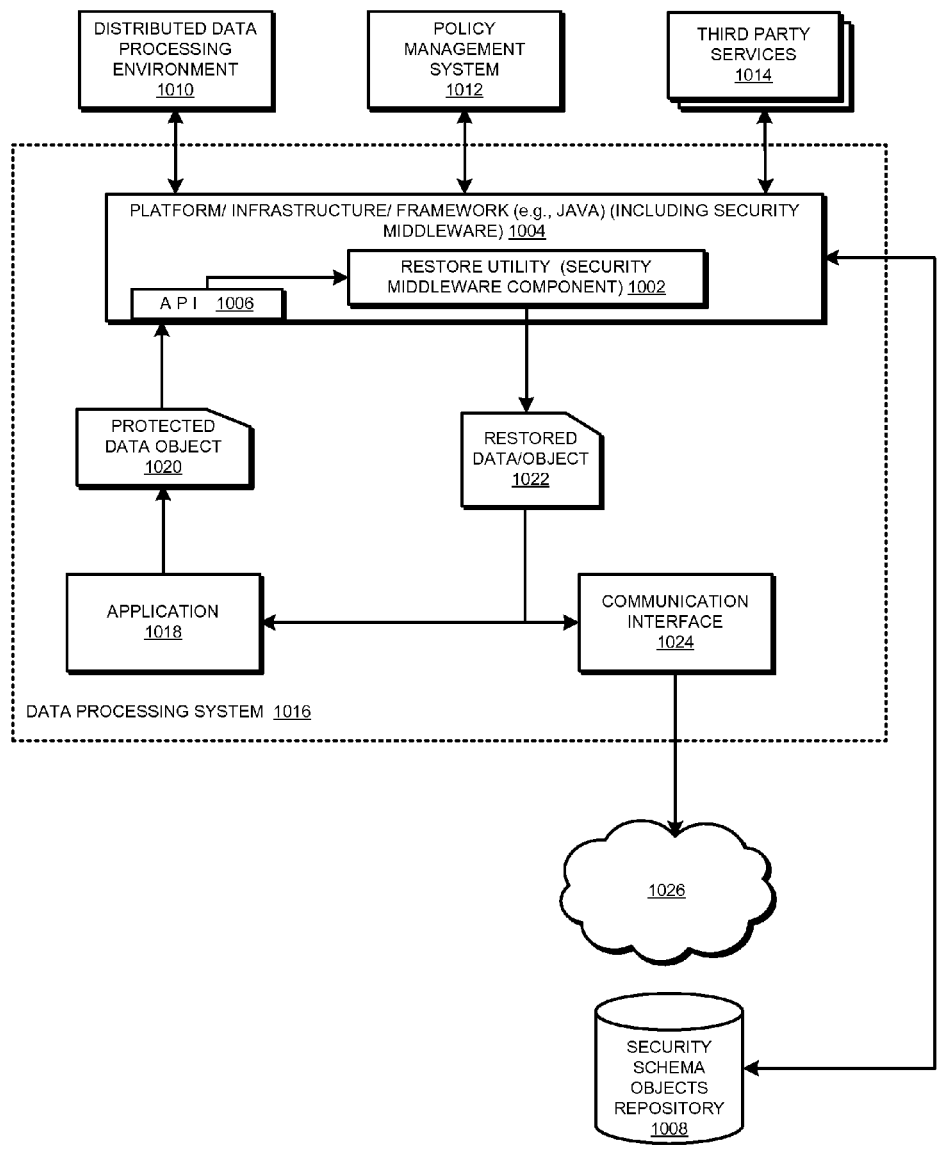
FIG. 10 depicts a block diagram of an example configuration of a restore utility in accordance with an illustrative embodiment.

With reference to FIG. 10, this figure depicts a block diagram of an example configuration of a restore utility in accordance with an illustrative embodiment. Restore utility 1002 is similar to restore utility 902 in FIG. 9.

Restore utility 1002 is implemented within security middleware 1004 as a security middleware component. Restore utility 1002 communicates with an application for restoring a protected data object such as a secure structured data object via API 1006.

Security middleware 1004 facilitates communication between restore utility 1002 and one or more other applications or data processing systems for performing an operation. As an example, restore utility 1002 is depicted as being able to communicate with security schema object repository 1008, distributed data processing environment 1010, policy management system 1012, and third party services 1014. Security schema object repository 1008 provides security schema objects to restore utility 1002 via security middleware 1004. Distributed data processing environment 1010 performs one or more operations of restore utility 1002. Third party services 1014 provides additional information or services to restore utility 1002 for performing an operation of restore utility 1002.

Policy management system 1012 provides policies or rules that are usable in performing an operation of restore utility 1002. For example, a policy provided by policy management system 1012 is usable to perform a post-processing after a transformation specification in a security schema object. For example, in one embodiment, a security schema object specifies a decryption of a particular part of a structured data object using a particular key. A policy provides that the decrypted data must then be scanned for malware before being consumed at an application within the enterprise. Accordingly, restore utility 1002 performs the post-processing according to the policy after an action according to a security schema object.

Security middleware 1004 execute in data processing system 1016. Application 1018 is a consumer application. Application 1018 is an application according to application code 352 in FIG. 3B, and has protected data object 1020 to be restored. Application 1018 calls API 1006 published by security middleware 1004 for restore utility 1002. The calling of API 1006 results in restored data 1022 being produced from restore utility. Restored data 1022 is returned to application 1018, or communicated via communication interface 1024 of data processing system 1016 over network 1026 to another application.

The security middleware based implementation of restore utility 1002 is depicted only as an example for the clarity of the description. Many other configurations of restore utility 1002, such as those described with respect to FIG. 11 but not limited thereto, will be apparent from this disclosure. Similarly, many other systems and applications configurable with restore utility 1002 in a similar manner will become apparent from this disclosure and the same are contemplated within the scope of the invention.

Figure 11:
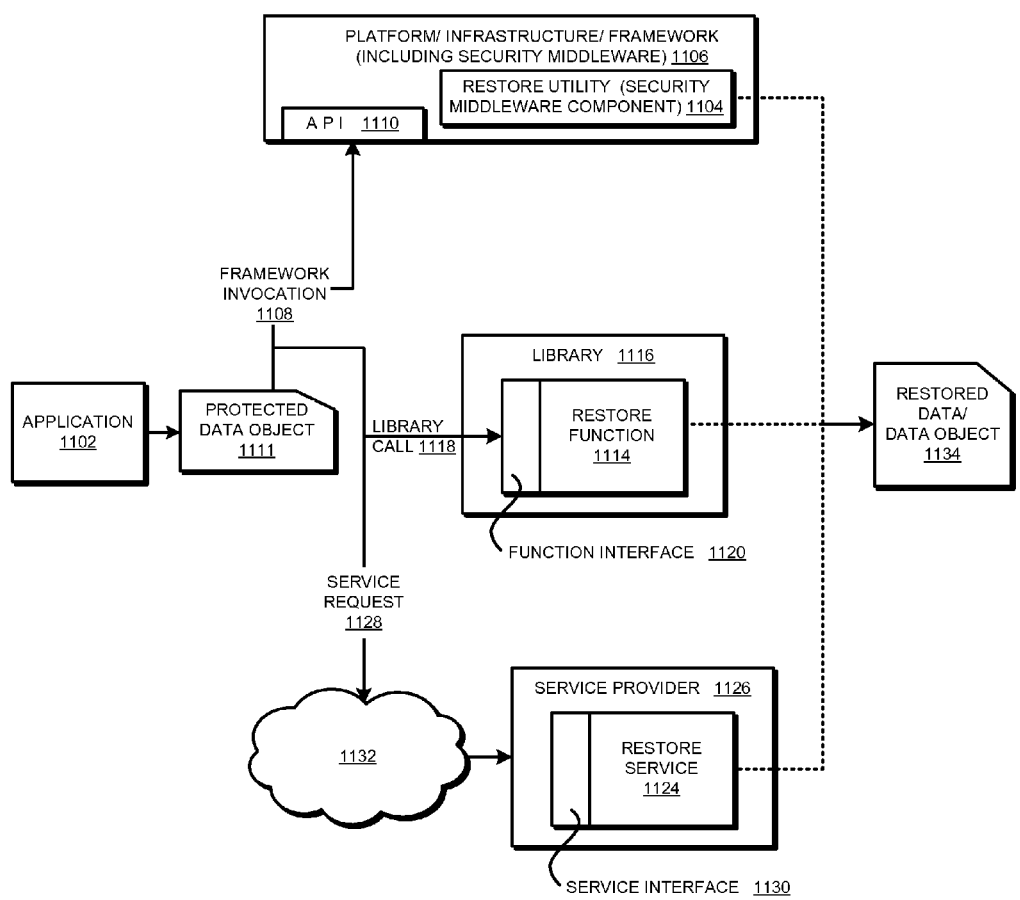
FIG. 11 depicts a block diagram of example alternative implementations for providing consistent cryptographic operations across several applications using structured data objects in accordance with an illustrative embodiment.

With reference to FIG. 11, this figure depicts a block diagram of example alternative implementations for providing consistent cryptographic operations across several applications using structured data objects in accordance with an illustrative embodiment. Application 1102 is similar to application 1018 in FIG. 10.

A restore utility according to an embodiment, such as restore utility 902 in FIG. 9, can be implemented or offered for use to application 1102 in a variety of ways. For example, in one embodiment, restore utility 1104 is implemented in security middleware 1106 as a security middleware component. Application 1102 invokes 1108 restore utility 1104's functionality via API 1110 published by security middleware 1106 using protected data object 1111.

In another embodiment, the restore utility, such as restore utility 902 in FIG. 9, takes the form of restore function 1114 in library 1116. As an example, library 1116 is a dynamic link library (DLL). Application 1102 makes library call 1118 using protected data object 1111 to invoke restore function 1114's functionality via function interface 1120 available from library 1116.

In another embodiment, the restore utility, such as restore utility 902 in FIG. 9, takes the form of restore service 1124 from service provider 1126. As an example, service provider 1126 is a third party web-service. Application 1102 makes service request 1128 using protected data object 1111 to use restore service 1124's functionality via service interface 1130 published or registered by service provider 1126. Application 1102 makes service request 1128 over data network 1132 and service provider 1126 is a server accessible using data network 1132.

Restored data or restored data object 1134 results from the execution of an implementation of the restore utility. For example, in one embodiment, when entire protected data object 1111 is not restored due to a policy or authorization limitation, restored data is in an object form. In another embodiment, when entire protected data object 1111 is not restored due to a policy or authorization limitation, restored data is not in an object form. Various implementations of the restore utility are described in FIG. 11 only as examples. These examples are neither intended to be limiting on the invention, nor intended to be implemented in exclusivity with one another within the scope of the invention. In one embodiment, application 1102 may have access to restore utility 1104, restore function 1114, restore service 1124, or a combination thereof, simultaneously.

The various interfaces are described to illustrate how certain functionality, such as the protection, restoration, and validation functionalities, are offered through a portable, application independent, security middleware based implementation. Additional types of interfaces usable in a similar manner with be conceivable from this disclosure and are contemplated within the scope of the invention. Furthermore, any functionality that is offered via an interface according to an embodiment may be implemented, offered, or installed as an extension of the security middleware.

Furthermore, additional functionalities that can be offered via such interfaces in a security middleware based implementation are also contemplated within the scope of the invention. For example, in an embodiment, the ability to create, manage, or otherwise manipulate the security schema or security schema objects is also a functionality implemented via an interface similar to the protection utility. As another example, in another embodiment, the functionality to initialize a repository, such as a security schema objects repository, is another interface in a security middleware based implementation. Generally, features and functions of an embodiment described separately from a security middleware may be implemented within the security middleware and may be offered via an interface to a user or application within the scope of the invention.

Figure 12:
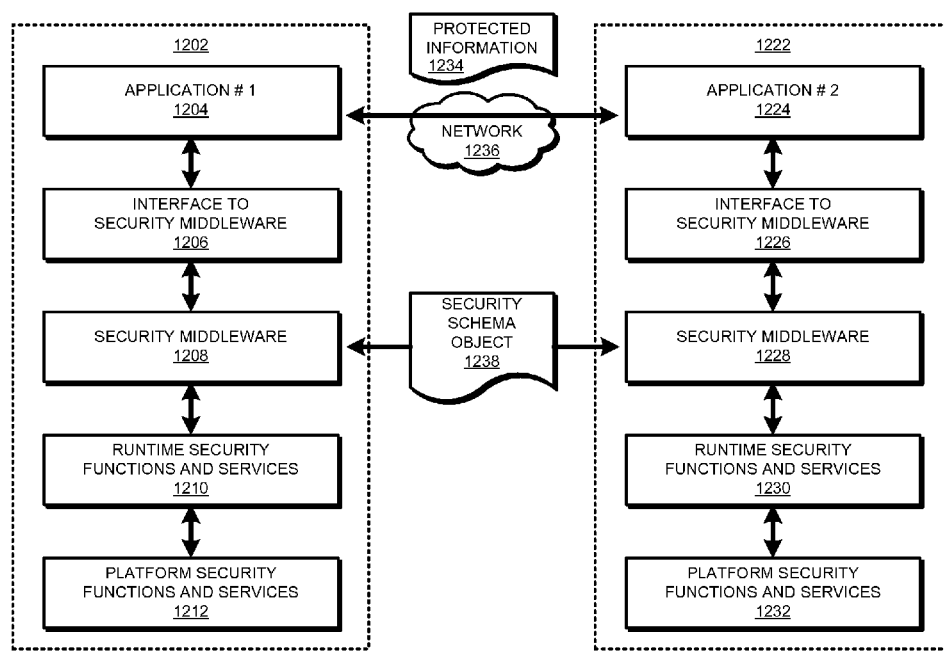
FIG. 12 depicts a block diagram of deploying security middleware and associated interfaces in accordance with an illustrative embodiment.

With reference to FIG. 12, this figure depicts a block diagram of deploying security middleware and associated interfaces in accordance with an illustrative embodiment. Configurations including security middleware and associated interfaces according to an embodiment can be deployed at different data processing systems to facilitate consistent cryptographic operations between applications executing on those data processing systems. For example, configuration 1202 is implemented on a first data processing system and configuration 1222 is implemented on a second data processing system. Configuration 1202 includes application 1204, interface 1206, security middleware 1208, runtime services 1210, and platform service 1212, which interact with each other in the manner of configuration 552 in FIG. 5C. Configuration 1222 includes application 1224, interface 1226, security middleware 1228, runtime services 1230, and platform service 1232, which interact with each other in the manner of configuration 580 in FIG. 5D.

Using interface 1206 and security middleware 1208, application 1204 creates and sends protected information 1234, such as a protected structured data object of an embodiment, over data network 1236. Security middleware 1208 uses security schema object 1238 to construct protected information 1234.

Using interface 1226 and security middleware 1228, application 1224 restores protected information 1234, received from application 1204 over data network 1236. Security middleware 1228 uses security schema object 1238 to restore protected information 1234 into the original information that application 1204 intended to send application 1224.

Figure 13:
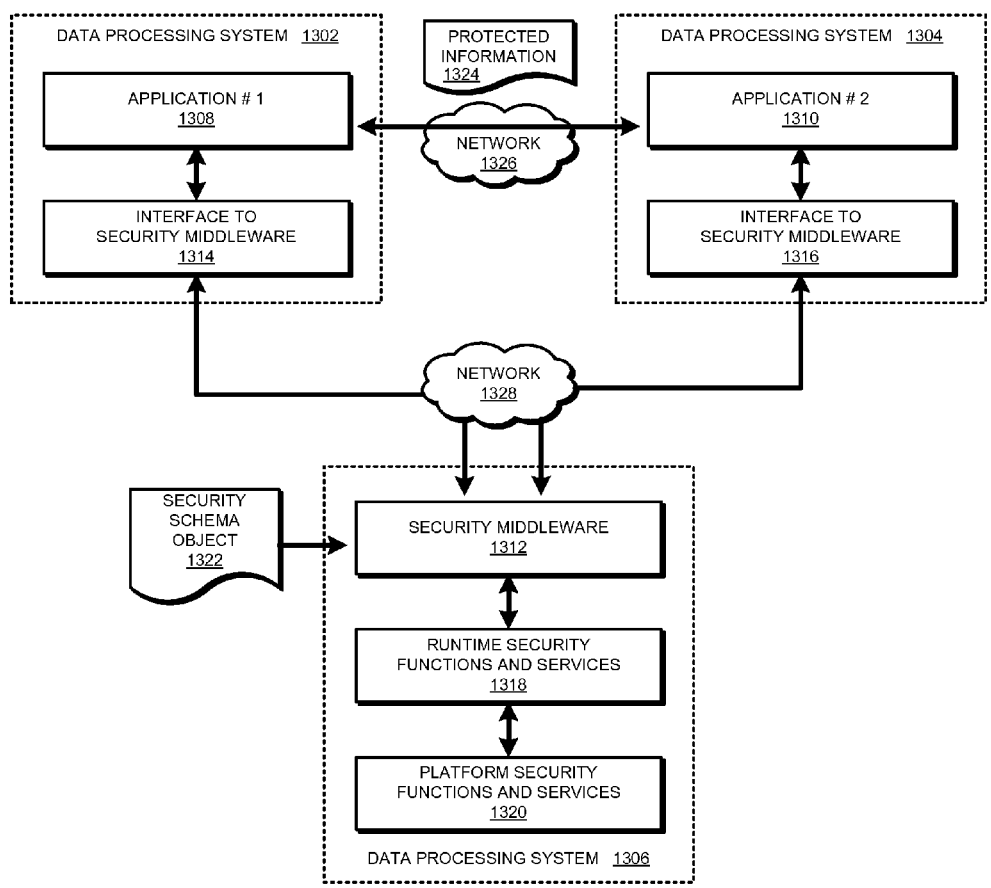
FIG. 13 depicts a block diagram of deploying security middleware and associated interfaces in a remote configuration in accordance with an illustrative embodiment.

With reference to FIG. 13, this figure depicts a block diagram of deploying security middleware and associated interfaces in a remote configuration in accordance with an illustrative embodiment. Data processing system 1302, 1304, and 1306 are separate data processing systems in the same or different networks. Data processing system 1302 includes application 1308, which wishes to exchange cryptographic information in a consistent manner according to an embodiment, with application 1310 executing in data processing system 1304. Applications 1308 and 1310 are similar to applications 1204 and 1224 in FIG. 12.

Security middleware 1312 is deployed on data processing system 1306, remotely from application 1308 on data processing system 1302 and application 1310 on data processing system 1304. Security middleware 1312 presents interface 1314 to application 1308 and interface 1316 to application 1310 over network 1328. Interfaces 1314 and 1316 can be customized for presentation on different data processing systems. The combination of security middleware 1312 and interfaces 1314 corresponds to security middleware 1208 and interface 1206 in configuration 1202 in FIG. 12. The combination of security middleware 1312 and interfaces 1316 corresponds to security middleware 1228 and interface 1226 in configuration 1222 in FIG. 12.

Security middleware 1312 performs the security operations, including formatting, transformations, and consistent cryptographic operations, as described herein. In performing the security operations, security middleware 1312 utilizes runtime services 1318 and platform service 1320 in the manner described elsewhere in this disclosure. In addition, for performing the security operations, security middleware 1312 further utilizes security schema object 1322 in the manner described elsewhere in this disclosure.

Using interface 1314 and security middleware 1312, application 1308 creates and sends protected information 1324, such as a protected structured data object of an embodiment, over data network 1326. Using interface 1316 and security middleware 1312, application 1310 restores protected information 1324, received from application 1308 over data network 1326. Security middleware 1312 uses security schema object 1322 to both protect and restore protected information 1324 for applications 1308 and 1310 respectively.

In one embodiment, data processing systems 1302, 1304, and 1306 are on a common network, such as a LAN, and networks 1326 and 1328 are one and the same. In another embodiment, data processing systems 1302 and 1304 are on a common network, such as a LAN, and data processing system 1306 is on a different network, such as a WAN, causing networks 1326 and 1328 to be distinct from one another. In another embodiment, each of data processing systems 1302, 1304 and 1306 are on different networks, such as separate LANs, and communicate with each other for interface presentation and protected information exchange over a combination of data networks.

Figure 14:
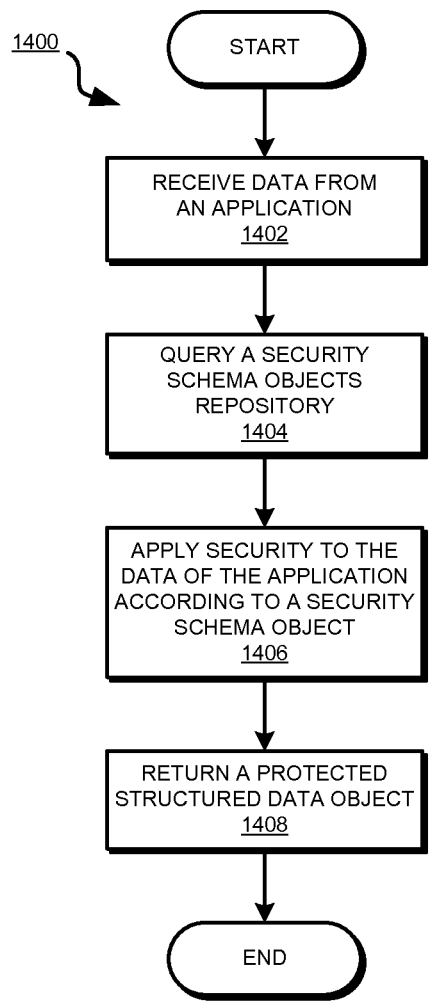
FIG. 14 depicts a flowchart of a process of protecting a structured data object in accordance with an illustrative embodiment.

With reference to FIG. 14, this figure depicts a flowchart of a process of protecting a structured data object in accordance with an illustrative embodiment. Process 1400 can be implemented in any implementation of a protection utility, such as in protection utility 704, protection function 714, or protection service 724 in FIG. 7.

Process 1400 begins by receiving a data input from an application (step 1402). Process 1400 queries a security schema objects repository (step 1404). Process 1400 applies security to the data of step 1402 according to a security schema object (step 1406). Process 1400 returns a protected data object, such as a secure structured data object, using the transformed data input and the security schema object (step 1408). Process 1400 ends thereafter.

Figure 15:
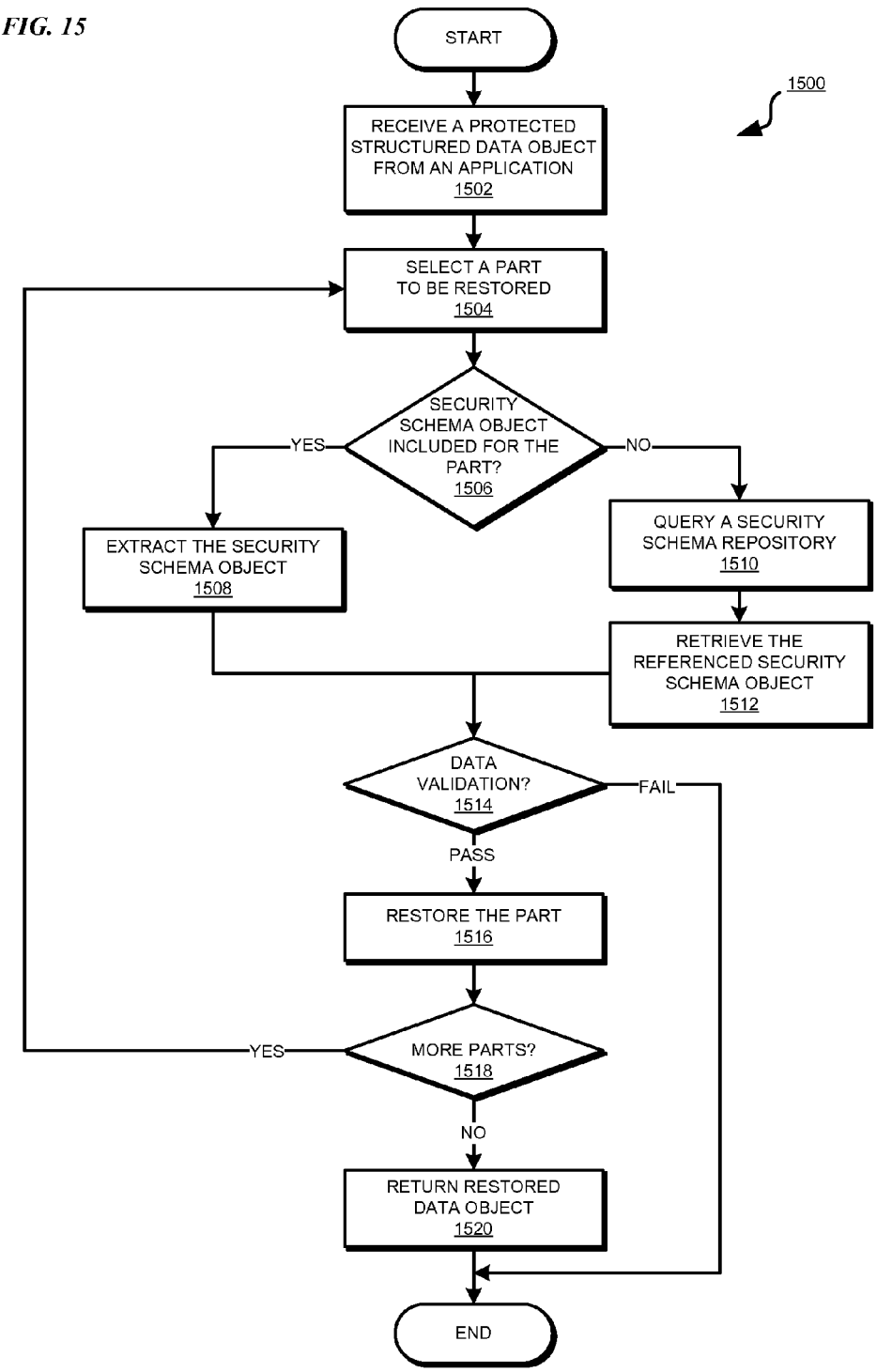
FIG. 15 depicts a flowchart of a process of restoring a secure structured data object in accordance with an illustrative embodiment.

With reference to FIG. 15, this figure depicts a flowchart of a process of restoring a secure structured data object in accordance with an illustrative embodiment. Process 1500 can be implemented in any implementation of a restore utility, such as restore utility 1104, restore function 1114, or restore service 1124 in FIG. 11.

Process 1500 begins by receiving a protected data object, such as a secure structured data object (step 1502). Process 1500 selects a part of the protected data object to be restored (step 1504). Process 1500 determines whether a security schema object accompanies the protected data object for restoring that selected part (step 1506).

If a security schema object accompanies the protected data object, such as by being included in the protected data object ("Yes" path of step 1506), process 1500 unpacks the protected data object to retrieve the security schema object (step 1508). If a security schema object does not accompany the protected data object by direct inclusion but a reference to the security schema object is included as a property of the protected data object ("No" path of step 1506), process 1500 communicates with a security schema object store using the reference (step 1510). Process 1500 receives the referenced security schema object (step 1512).

Process 1500 validates a part of the protected data object (step 1514). In one embodiment, process 1500 validates either the entire protected data object, or a part thereof, in step 1514. If the protected data object or the part thereof passes the data validation ("Pass" path of step 1514), process 1500 proceeds to step 1516. If the protected data object or the part thereof fails the data validation ("Fail" path of step 1514), process 1500 may end thereafter, or send a failure notification and then end.

Process 1500 restores the part using the security schema object (step 1516).

Process 1500 determines whether more parts in the protected data object have to be restored (step 1518). If more parts have to be restored ("Yes" path of step 1518), process 1500 returns to step 1504. If no more parts of the protected data object have to be restored ("No" path of step 1518), process 1500 returns the restored data object (step 1520) and ends thereafter. In step 1520, process 1500 returns a restored data object that is fully or partially restored according to the policies in the applicable in the data processing environment or the authorizations of the application or user that requested the execution of process 1500.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for providing consistent cryptographic operations across several applications using secure structured data objects. Using an embodiment of the invention, the protection utility and the restore utility can be implemented in any type of security framework. A framework based implementation allows an application to use the utilities' features without having to learn the specifics of the security feature's implementation but only by learning how the framework has published the utilities' interfaces. An application using an embodiment can be an originating application, a consumer application, or both.

Furthermore, such framework based implementation of the protection and restore utilities allows for modifying the utilities themselves, or the security schema objects they use, without causing a disruption of service to the producers or consumers of protected data objects. Additionally, an embodiment allows for the separation of responsibilities between the application developer and the security administrator. Neither of those job functions or any of the corresponding several applications has to know the details of the other's implementation.

An embodiment also prevents clear data from becoming visible to an application or an application developer outside of the security infrastructure. Because the applications operating in the application space can be separated from the security implementation in an embodiment, any clear data that becomes available during the security processing according to an embodiment remains out of reach or knowledge of the applications. Furthermore, depending on the policies prevalent in the data processing environment, authorizations of certain applications or users, or a combination thereof, all or some parts of the clear data can be protected in this manner.

A utility according to an embodiment can operate on any form of data input without limitation. A utility according to an embodiment can also produce or restore any form of structured data object, including but not limited to XML implementations of structured data objects. A protected data object includes but is not limited to a secure structured data object of any particular form.

A framework-based implementation of an embodiment is not limited to providing only the protection and restoration functions. Additional functions, such as application authentication, data verification and validation, error detection and correction, and many other features usable in packaging structured data objects can similarly be provided from such an implementation within the scope of the invention. Some of these features are described elsewhere in this disclosure as features of the protection and restore utilities, and can be provided through these utilities' interfaces or separate interfaces in a similar manner.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable device providing program code for use by or in connection with a computer or any instruction execution system. For the purposes of this description, a computer-usable or computer-readable device can be any hardware apparatus that can store the program for use by or in connection with the instruction execution system, apparatus, or device.

The device can be an electronic, magnetic, optical, electromagnetic, or semiconductor system (or apparatus or device). Examples of a computer-readable device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage device may store a computer-readable program code such that when the computer-readable program code is executed on a computer, the execution of this computer-readable program code causes the computer to transmit another computer-readable program code. The terms "computer usable storage device," "computer readable storage device," and "storage device" do not encompass a signal propagation medium, any description in this disclosure to the contrary notwithstanding.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for providing consistent cryptographic operations for a plurality of applications executing in a data processing system, the method comprising:
   receiving, by a security middleware component, through the use of an application programming interface, a data input from an originating application operating in application space, both the application and the middleware component executing in the data processing system;
   retrieving a security schema object by the security middleware component from an object store, the security schema object describing a sequence of cryptographic operations, wherein the security schema object includes a plurality of components, each component describing an aspect of the cryptographic operations;
   transforming the data input from a first format to a second format, wherein one of the first and second formats is a secure structured data object formed using the sequence of cryptographic operations;

populating a property of the secure structured data object, separate from the transformed data input, such that the property is usable by a consumer application to access the security schema object to recover the data input from the secure structured data object at the consumer application; and transmitting the data input in the second format to the consumer application operating in application space.

2. The method of claim 1, wherein the security middleware component is called by a plurality of originating applications by means of an application programming interface to provide consistent cryptographic operations in the data processing system.

3. The method of claim 1, wherein the second format is the secure structured data object and the method further comprises:

receiving the secure structured data object at the security middleware component from the consumer application through the use of an application programming interface, in a request for validation and restoration of the secure structured data object;

retrieving the security schema object using the property of the secure structured data object populated with data about the security schema object;

validating the secure structured data object by the security middleware component using the security schema object; and restoring the secure structured data object to the data input by the security middleware component using the security schema object, so that cryptographic operations used by the originating and consumer applications are consistent through the use of the security schema object and the security middleware component.

4. The method of claim 1, wherein the security schema object includes a transformation component, a layout component, and a data flow component and wherein the transformation component describes an output format, the layout component describes a normalized input format and the data flow component of the security schema object describes a sequence of cryptographic operations to be followed when using the security schema object.

5. The method of claim 1, wherein a first application is both the originating application and the consumer application.

6. The method of claim 1, wherein the property of the secure structured data object is a reference to the security schema object.

7. The method of claim 1, further comprising:

parsing, by the security middleware component, the data input in the first format;

normalizing, by the security middleware component, the data input to a layout format;

applying, by the security middleware component, transformation of elements in the layout format according to the security schema object;

applying, by the security middleware component, protection of elements in the layout format according to the security schema object; and formatting, by the security middleware component, the transformed and protected elements to the second format.

8. The method of claim 7, wherein the applying the transformation and applying the protection comprise a calling of services in the data processing system in a runtime services or platform services layer.

9. The method of claim 8, wherein the called services are selected from a group of encryption services, digital signing services or hashing services.

10. The method of claim 8, wherein keys and certificates for use by the middleware security component are stored in a platform services layer.

11. A computer usable program product comprising a computer usable storage device including computer usable code for providing consistent cryptographic operations for a plurality of applications executing in a data processing system, the computer usable program product comprising:

computer usable code for receiving, by a security middleware component, through the use of an application programming interface, a data input from an originating application operating in application space, both the application and the middleware component executing in the data processing system;

computer usable code for retrieving a security schema object by the security middleware component from an object store, the security schema object describing a sequence of cryptographic operations, wherein the security schema object includes a plurality of components, each component describing an aspect of the cryptographic operations;

computer usable code for transforming the data input from a first format to a second format, wherein one of the first and second formats is a secure structured data object formed using the sequence of cryptographic operations;

computer usable code for populating a property of the secure structured data object, separate from the transformed data input, such that the property is usable by a consumer application to access the security schema object to recover the data input from the secure structured data object at the consumer application; and computer usable code for transmitting the data input in the second format to the consumer application operating in application space.

12. The computer usable program product of claim 11, wherein the security middleware component is called by a plurality of originating applications by means of an application programming interface to provide consistent cryptographic operations in the data processing system.

13. The computer usable program product of claim 11, wherein the second format is the secure structured data object and the computer usable program product further comprises:

computer usable code for receiving the secure structured data object at the security middleware component from the consumer application through the use of an application programming interface, in a request for validation and restoration of the secure structured data object;

computer usable code for retrieving the security schema object using the property of the secure structured data object populated with data about the security schema object;

computer usable code for validating the secure structured data object by the security middleware component using the security schema object; and computer usable code for restoring the secure structured data object to the data input by the security middleware component using the security schema object, so that cryptographic operations used by the originating and consumer applications are consistent through the use of the security schema object and the security middleware component.

14. The computer usable program product of claim 11, wherein the security schema object includes a transformation component, a layout component, and a data flow component and wherein the transformation component describes an output format, the layout component describes a normalized input format and the data flow component of the security schema object describes a sequence of cryptographic operations to be followed when using the security schema object.

15. The computer usable program product of claim 11, wherein a first application is both the originating application and the consumer application.

16. The computer usable program product of claim 11, wherein the property of the secure structured data object is a reference to the security schema object.

17. The computer usable program product of claim 11, wherein the security middleware component, further comprises:
- computer usable code for parsing the data input in the first format;
- computer usable code for normalizing the data input to a layout format;
- computer usable code for applying transformation of elements in the layout format according to the security schema object;
- computer usable code for applying protection of elements in the layout format according to the security schema object; and
- computer usable code for formatting the transformed and protected elements to the second format.

18. The computer usable program product of claim 11, wherein the computer usable code for receiving, the computer usable code for retrieving, the computer usable code for transforming, and the computer usable code for transmitting are stored in a first computer readable storage device in a data processing system, and wherein the computer usable code for receiving, the computer usable code for retrieving, the computer usable code for transforming, and the computer usable code for transmitting are transferred over a network from a remote data processing system.

19. The computer usable program product of claim 11, wherein the computer usable code for receiving, the computer usable code for retrieving, the computer usable code for transforming, and the computer usable code for transmitting are stored in a first computer readable storage device in a server data processing system, and wherein the computer usable code for receiving, the computer usable code for retrieving, the computer usable code for transforming, and the computer usable code for transmitting are downloaded over a network to a remote data processing system for use in a second computer readable storage device associated with the remote data processing system.

20. A data processing system for providing consistent cryptographic operations for a plurality of applications executing in a data processing system, the data processing system comprising:
- a storage device including wherein the storage device stores computer usable program code; and
- a processor, wherein the processor executes the computer usable program code, and wherein the computer usable program code comprises:
  - computer usable code for receiving, by a security middleware component, through the use of an application programming interface, a data input from an originating application operating in application space, both the application and the middleware component executing in the data processing system;
  - computer usable code for retrieving a security schema object by the security middleware component from an object store, the security schema object describing a sequence of cryptographic operations, wherein the security schema object includes a plurality of components, each component describing an aspect of the cryptographic operations;
  - computer usable code for transforming the data input from a first format to a second format, wherein one of the first and second formats is a secure structured data object formed using the sequence of cryptographic operations;
  - computer usable code for populating a property of the secure structured data object, separate from the transformed data input, such that the property is usable by a consumer application to access the security schema object to recover the data input from the secure structured data object at the consumer application; and
  - computer usable code for transmitting the data input in the second format to the consumer application operating in application space.

* * * * *